United States Patent
Sharifi et al.

(10) Patent No.: US 12,496,305 B2
(45) Date of Patent: Dec. 16, 2025

(54) DETECTION FOR DETERMINING CORTICOSTEROID RESPONSIVENESS

(71) Applicant: The Cleveland Clinic Foundation, Cleveland, OH (US)

(72) Inventors: Nima Sharifi, Shaker Heights, OH (US); Joe G. Zein, Mayfield Heights, OH (US); Benjamin Gaston, Gates Mills, OH (US)

(73) Assignees: The Cleveland Clinic Foundation, Cleveland, OH (US); Case Western Reserve University, Cleveland, OH (US)

( * ) Notice: Subject to any disclaimer, the term of this patent is extended or adjusted under 35 U.S.C. 154(b) by 1172 days.

(21) Appl. No.: 16/940,568

(22) Filed: Jul. 28, 2020

(65) Prior Publication Data

US 2021/0032698 A1    Feb. 4, 2021

Related U.S. Application Data

(60) Provisional application No. 62/880,426, filed on Jul. 30, 2019.

(51) Int. Cl.
*C12Q 1/6883* (2018.01)
*A61K 31/573* (2006.01)

(52) U.S. Cl.
CPC .......... *A61K 31/573* (2013.01); *C12Q 1/6883* (2013.01); *C12Q 2600/106* (2013.01); *C12Q 2600/156* (2013.01)

(58) Field of Classification Search
CPC ........ C12Q 2600/156; C12Q 2600/106; C12Q 1/6883; A61K 31/573
See application file for complete search history.

(56) References Cited

U.S. PATENT DOCUMENTS

| 5,210,015 A | 5/1993 | Gelfand et al. |
| 5,352,803 A | 10/1994 | Mattingly |

(Continued)

FOREIGN PATENT DOCUMENTS

| WO | WO 97/22719 | 6/1997 |
| WO | WO 00/018957 | 4/2000 |
| WO | WO 2006/084132 | 8/2006 |

OTHER PUBLICATIONS

Matsumura, Y. Inadequate therapeutic responses to glucocorticoid treatment in bronchial asthma, J. Int. Med. Res., vol. 51, pp. 1-10 (Year: 2023).*

(Continued)

*Primary Examiner* — Gary Benzion
*Assistant Examiner* — Lisa Horth
(74) *Attorney, Agent, or Firm* — Jason R. Bond; Casimir Jones, S.C.

(57) ABSTRACT

The present invention relates to methods, kits, and compositions for testing a sample from a subject with asthma to determine: i) if the subject is A/A or A/C at position 1245 in the HSD3B1 gene, and/or if the subject expresses a 367N version of the 3β-HSD1 protein (e.g., and should be administered a non-corticosteroid for their asthma), or ii) if the subject is C/C at position 1245 in the HSD3B1 gene, and/or if the subject expresses only the 367T version of the 3β-HSD1 protein (e.g., and should be administered a corticosteroid for their asthma). In certain embodiments, the corticosteroid is a glucocorticoid.

8 Claims, 17 Drawing Sheets
(15 of 17 Drawing Sheet(s) Filed in Color)

(56) References Cited

U.S. PATENT DOCUMENTS

| | | | |
|---|---|---|---|
| 5,359,093 A | 10/1994 | Adamczyk et al. | |
| 5,496,925 A | 3/1996 | Mattingly | |
| 5,538,848 A | 7/1996 | Livak et al. | |
| 5,545,527 A * | 8/1996 | Stevens | |
| 5,573,904 A | 11/1996 | Mattingly | |
| 5,593,896 A | 1/1997 | Adamczyk et al. | |
| 5,695,934 A | 12/1997 | Brenner | |
| 5,714,330 A | 2/1998 | Brenner et al. | |
| 5,750,341 A | 5/1998 | Macevicz | |
| 5,863,736 A | 1/1999 | Haaland | |
| 5,945,283 A | 8/1999 | Kwok et al. | |
| 6,306,597 B1 | 10/2001 | Macevicz | |
| 6,432,360 B1 | 8/2002 | Church | |
| 6,485,944 B1 | 11/2002 | Church et al. | |
| 6,511,803 B1 | 1/2003 | Church et al. | |
| 6,787,308 B2 | 9/2004 | Balasubramanian et al. | |
| 6,833,246 B2 | 12/2004 | Balasubramanian | |
| 9,856,535 B2 | 1/2018 | Handique et al. | |
| 9,856,536 B2 * | 1/2018 | Sharifi | A61K 31/58 |
| 2005/0130173 A1 | 6/2005 | Leamon et al. | |
| 2015/0018323 A1 * | 1/2015 | Sharifi | A61K 31/4166 |
| | | | 435/7.4 |

OTHER PUBLICATIONS

Mosteller, M et al., No evidence of large genetic effects on steroid response to asthma patients, J. Allergy Clin. Immunol., vol. 139, pp. 797-803 (Year: 2017).*

Chung, KF, Diagnosing and management of severe asthma, 2018, Semin Respir Crit Care Med, 39:091-099 (Year: 2018).*

Odell, Testosterone treatment of men treated with glucocorticoids, 1996, Arch Intern Mde, 156, 1133-1134 (Year: 1996).*

Adamczyk et al., Chemiluminescence quenching of pteroic acid-N-sulfonyl-acridinium-9-carboxamide conjugates by folate binding protein. Bioorg Med Chem Lett. May 3, 2004;14(9):2313-7.

Adamczyk et al., Chemiluminescent acridinium-9-carboxamide boronic acid probes: application to a homogeneous glycated hemoglobin assay. Bioorg Med Chem Lett. Mar. 1, 2006;16(5):1324-8.

Adamczyk et al., Intrinsic factor-mediated modulation of cyanocobalamin-N-sulfonyl-acridinium-9-carboxamide chemiluminescence. Bioorg Med Chem Lett. Aug. 2, 2004;14(15):3917-21.

Adamczyk et al., Regiodependent luminescence quenching of biotinylated N-sulfonyl-acridinium-9-carboxamides by avidin. Org Lett. Oct. 16, 2003;5(21):3779-82.

Adessi et al., Solid phase DNA amplification: characterisation of primer attachment and amplification mechanisms. Nucleic Acids Res. Oct. 15, 2000;28(20):E87.

Agarwal et al., Independent Validation of Effect of HSD3B1 Genotype on Response to Androgen-Deprivation Therapy in Prostate Cancer. JAMA Oncol. Jun. 1, 2017;3(6):856-857.

Auchus et al., The physiology and biochemistry of adrenarche. Endocr Dev. 2011;20:20-27.

Barnes et al., Glucocorticoid resistance in inflammatory diseases. Lancet. May 30, 2009;373(9678):1905-17.

Becklake et al., Gender differences in airway behaviour over the human life span. Thorax. Dec. 1999;54(12):1119-38.

Bennett et al., Toward the 1,000 dollars human genome. Pharmacogenomics. Jun. 2005;6(4):373-82.

Birren et al., Genome Analysis: Analyzing DNA, 1, Cold Spring Harbor, N.Y. 1997. TOC only. 12 pages.

Brenner et al., Gene expression analysis by massively parallel signature sequencing (MPSS) on microbead arrays. Nat Biotechnol. Jun. 2000;18(6):630-4.

Brusasco et al., Coming together: the ATS/ERS consensus on clinical pulmonary function testing. Eur Respir J. Jul. 2005;26(1):1-2.

Cephus et al., Testosterone Attenuates Group 2 Innate Lymphoid Cell-Mediated Airway Inflammation. Cell Rep. Nov. 28, 2017;21(9):2487-2499.

Chang et al., A gain-of-function mutation in DHT synthesis in castration-resistant prostate cancer. Cell. Aug. 29, 2013;154(5):1074-1084.

Chang et al., Second-generation PLINK: rising to the challenge of larger and richer datasets. Gigascience. Feb. 25, 2015;4:7.

Chung et al., International ERS/ATS guidelines on definition, evaluation and treatment of severe asthma. Eur Respir J. Feb. 2014;43(2):343-73.

Compton. Nucleic acid sequence-based amplification. Nature. Mar. 7, 1991;350(6313):91-2.

Deboer et al., Effects of endogenous sex hormones on lung function and symptom control in adolescents with asthma. BMC Pulm Med. Apr. 10, 2018;18(1):58.

Denlinger et al., Vitamin D Supplementation and the Risk of Colds in Patients with Asthma. Am J Respir Crit Care Med. Mar. 15, 2016;193(6):634-41.

Dorsey et al., Assessment of adrenal suppression in children with asthma treated with inhaled corticosteroids: use of dehydroepiandrosterone sulfate as a screening test. Ann Allergy Asthma Immunol. Aug. 2006;97(2):182-6.

Fuseini et al., Testosterone Decreases House Dust Mite-Induced Type 2 and IL-17A-Mediated Airway Inflammation. J Immunol. Oct. 1, 2018;201(7):1843-1854.

Gibson et al., A novel method for real time quantitative RT-PCR. Genome Res. Oct. 1996;6(10):995-1001.

Hazeldine et al., Dehydroepiandrosterone as a regulator of immune cell function. J Steroid Biochem Mol Biol. May 31, 2010;120(2-3):127-36.

Hearn et al., ASCO; 2019; Chicago, IL; 2019. 3 pages.

Hearn et al., Association of HSD3B1 Genotype With Response to Androgen-Deprivation Therapy for Biochemical Recurrence After Radiotherapy for Localized Prostate Cancer. JAMA Oncol. Apr. 1, 2018;4(4):558-562.

Hearn et al., HSD3B1 and resistance to androgen-deprivation therapy in prostate cancer: a retrospective, multicohort study. Lancet Oncol. Oct. 2016;17(10):1435-1444.

Heid et al., Real time quantitative PCR. Genome Res. Oct. 1996;6(10):986-94.

Hench et al., Effect of cortisone and pituitary adrenocorticotropic hormone (ACTH) on rheumatic diseases. J Am Med Assoc. Dec. 16, 1950;144(16):1327-35.

Holland et al., Detection of specific polymerase chain reaction product by utilizing the 5'-3' exonuclease activity of Thermus aquaticus DNA polymerase. Proc Natl Acad Sci U S A. Aug. 15, 1991;88(16):7276-80.

Jarjour et al., Severe asthma: lessons learned from the National Heart, Lung, and Blood Institute Severe Asthma Research Program. Am J Respir Crit Care Med. Feb. 15, 2012;185(4):356-62.

Kouloumenta et al., Non-genomic effect of testosterone on airway smooth muscle. Br J Pharmacol. Dec. 2006;149(8):1083-91.

Koziol-White et al., DHEA-S inhibits human neutrophil and human airway smooth muscle migration. Biochim Biophys Acta. Oct. 2012;1822(10):1638-42.

Labrie. Extragonadal synthesis of sex steroids: intracrinology. Ann Endocrinol (Paris). Apr. 2003;64(2):95-107.

Livak et al., Oligonucleotides with fluorescent dyes at opposite ends provide a quenched probe system useful for detecting PCR product and nucleic acid hybridization. PCR Methods Appl. Jun. 1995;4(6):357-62.

Luk et al., Partially double-stranded linear DNA probes: novel design for sensitive detection of genetically polymorphic targets. J Virol Methods. Sep. 2007;144(1-2):1-11.

Margulies et al., Genome sequencing in microfabricated high-density picolitre reactors. Nature. Sep. 15, 2005;437(7057):376-80.

Mendoza-Milla et al., Dehydroepiandrosterone has strong antifibrotic effects and is decreased in idiopathic pulmonary fibrosis. Eur Respir J. Nov. 2013;42(5):1309-21.

Miller et al., Standardisation of spirometry. Eur Respir J. Aug. 2005;26(2):319-38.

Mitra et al., Fluorescent in situ sequencing on polymerase colonies. Anal Biochem. Sep. 1, 2003;320(1):55-65.

(56) References Cited

OTHER PUBLICATIONS

Mohan et al., Higher serum testosterone and dihydrotestosterone, but not oestradiol, are independently associated with favourable indices of lung function in community-dwelling men. Clin Endocrinol (Oxf). Aug. 2015;83(2):268-76.

Moore et al., Characterization of the severe asthma phenotype by the National Heart, Lung, and Blood Institute's Severe Asthma Research Program. J Allergy Clin Immunol. Feb. 2007;119(2):405-13.

Moore et al., Identification of asthma phenotypes using cluster analysis in the Severe Asthma Research Program. Am J Respir Crit Care Med. Feb. 15, 2010;181(4):315-23.

Neri et al., Transferring Automation for Large-scale Development and Production of Invader SNP Assays. Advances in Nucleic Acid and Protein Analysis. 2000. 3826:117-125.

Phipatanakul et al., Effects of Age and Disease Severity on Systemic Corticosteroid Responses in Asthma. Am J Respir Crit Care Med. Jun. 1, 2017;195(11):1439-1448.

Piatek et al., Molecular beacon sequence analysis for detecting drug resistance in *Mycobacterium tuberculosis*. Nat Biotechnol. Apr. 1998;16(4):359-63.

Proceedings of the ATS workshop on refractory asthma: current understanding, recommendations, and unanswered questions. American Thoracic Society. Am J Respir Crit Care Med. Dec. 2000;162(6):2341-51.

Purcell et al., PLINK: a tool set for whole-genome association and population-based linkage analyses. Am J Hum Genet. Sep. 2007;81(3):559-75.

Quanjer et al., Multi-ethnic reference values for spirometry for the 3-95-yr age range: the global lung function 2012 equations. Eur Respir J. Dec. 2012;40(6):1324-43.

Sharifi. Minireview: Androgen metabolism in castration-resistant prostate cancer. Mol Endocrinol. May 2013;27(5):708-14.

Shendure et al., Accurate multiplex polony sequencing of an evolved bacterial genome. Science. Sep. 9, 2005;309(5741):1728-32.

Shiota et al., Association of Missense Polymorphism in HSD3B1 With Outcomes Among Men With Prostate Cancer Treated With Androgen-Deprivation Therapy or Abiraterone. JAMA Netw Open. Feb. 1, 2019;2(2):e190115. 11 pages.

Sohn et al., Capacitance cytometry: measuring biological cells one by one. Proc Natl Acad Sci U S A. Sep. 26, 2000;97(20):10687-90.

Svartberg et al., Reduced pulmonary function is associated with lower levels of endogenous total and free testosterone. The Tromsø study. Eur J Epidemiol. 2007;22(2):107-12.

Tantisira et al., Airway responsiveness in mild to moderate childhood asthma: sex influences on the natural history. Am J Respir Crit Care Med. Aug. 15, 2008;178(4):325-31.

Teague et al., Baseline Features of the Severe Asthma Research Program (SARP III) Cohort: Differences with Age. J Allergy Clin Immunol Pract. Mar.-Apr. 2018;6(2):545-554.e4.

The ENFUMOSA cross-sectional European multicentre study of the clinical phenotype of chronic severe asthma. European Network for Understanding Mechanisms of Severe Asthma. Eur Respir J. Sep. 2003;22(3):470-7.

Thelwell et al., Mode of action and application of Scorpion primers to mutation detection. Nucleic Acids Res. Oct. 1, 2000;28(19):3752-61.

Tse et al., Sex-specific risk factors for childhood wheeze and longitudinal phenotypes of wheeze. J Allergy Clin Immunol. Dec. 2016;138(6):1561-1568.e6.

Tyagi et al., Molecular beacons: probes that fluoresce upon hybridization. Nat Biotechnol. Mar. 1996;14(3):303-8.

Tyagi et al., Multicolor molecular beacons for allele discrimination. Nat Biotechnol. Jan. 1998;16(1):49-53.

Xu et al., Effects and mechanism of dehydroepiandrosterone on epithelial-mesenchymal transition in bronchial epithelial cells . Exp Lung Res. Jun. 2014;40(5):211-21.

\* cited by examiner

FIGURE 13

| Neutrophil count (/mm³) by genotype in patients treated with daily oral glucocorticoids | | |
|---|---|---|
| Genotype | Mean | SD |
| AA | 6687.3 | 2608.2 |
| AC | 7347.9 | 2837.8 |
| CC | 4915.4 | 1897.0 |

DETECTION FOR DETERMINING CORTICOSTEROID RESPONSIVENESS

The present application claims priority to U.S. Provisional application Ser. No. 62/880,426, filed Jul. 30, 2019, which is herein incorporated by reference in its entirety.

This invention was made with government support under CA168899, CA172382, CA190289, HL133381, HL128192, HL139126 and HL109250 awarded by the National Institutes of Health. The government has certain rights in the invention.

FIELD OF THE INVENTION

The present invention relates to methods, kits, and compositions for testing a sample from a subject with asthma to determine: i) if the subject is A/A or A/C at position 1245 in the HSD3B1 gene, and/or if the subject expresses a 367N version of the 3β-HSD1 protein (e.g., and should be administered a non-corticosteroid for their asthma), or ii) if the subject is C/C at position 1245 in the HSD3B1 gene, and/or if the subject expresses only the 367T version of the 3β-HSD1 protein (e.g., and should be administered a corticosteroid for their asthma). In certain embodiments, the corticosteroid is a glucocorticoid.

BACKGROUND

Asthma affects a wide spectrum of individuals with diverse immunological and biochemical endotypic responses that lead to a variety of asthma phenotypes. Despite the recognized heterogeneity of asthma, treatment is prescribed equally to all patients in a uniformly applied stepped-care approach. Current practice relies on subjective symptoms, asthma control tests, or measure of airflow obstruction to add on, or step down therapy. This approach is post-hoc, and often results in under- and/or over-treatment. The morbidities and costs associated with this common disease and the lack of ability to finely tune care provide the imperative to develop personalized medicine approaches aimed at underlying mechanisms. Quantifiable non-invasive biomarkers that are informative for asthma control and airway inflammation are needed for personalized asthma treatment plans and will be essential in planning therapies and assessing efficacy of biologics such as anti-IgE, anti-IL5, and others. But, in the absence of appropriately sensitive tests to identify responder endotypes, patients will not fully realize the benefits of these new therapies.

SUMMARY OF THE INVENTION

The present invention relates to methods, kits, and compositions for testing a sample from a subject with asthma to determine: i) if the subject is A/A or A/C at position 1245 in the HSD3B1 gene, and/or if the subject expresses a 367N version of the 3β-HSD1 protein (e.g., and should be administered a non-corticosteroid for their asthma), or ii) if the subject is C/C at position 1245 in the HSD3B1 gene, and/or if the subject expresses only the 367T version of the 3β-HSD1 protein (e.g., and should be administered a corticosteroid for their asthma). In certain embodiments, the corticosteroid is a glucocorticoid.

In some embodiments, provided herein are methods comprising: a) testing a sample from a human subject with asthma and determining: i) if the subject is A/A, A/C, or C/C at position 1245 in the HSD3B1 gene, and/or ii) if the subject expresses only the 367T version, only the 367N version, or both the 367T and 367N versions, of the 3β-HSD1 protein; and b) performing at least one of the following: i) generating, transmitting, and/or graphically displaying a report that: A) the subject is A/A or A/C at position 1245 in the HSD3B1 gene or expresses a 367N version of the 3β-HSD1 protein and is at least partially corticosteroid resistant and/or should be treated with a non-corticosteroid agent (e.g., a non-corticosteroid agent alone or with another agent, including a corticosteroid agent), or B) the subject is C/C at position 1245 in the HSD3B1 gene or expresses only a 367T version of the 3β-HSD1 protein and is corticosteroid responsive and/or should be treated with a corticosteroid (e.g., a corticosteroid alone); ii) determining the subject is C/C at position 1245 in the HSD3B1 gene and/or expresses only a 367T version of the 3β-HSD1 protein, and treating the subject with a corticosteroid; and/or iii) determining the subject is A/A or A/C in the HSD3B1 gene or expresses a 367N version of the 3β-HSD1 protein, and treating the subject with a non-corticosteroid agent.

In certain embodiments, provided herein are methods comprising: a) receiving and/or reviewing a report that a subject with asthma is C/C at position 1245 in the HSD3B1 gene and/or expresses only a 367T version of the 3β-HSD1 protein; and b) treating the subject with a corticosteroid.

In certain embodiments, provided herein are methods comprising: a) receiving and/or reviewing a report that a subject with asthma is A/A or A/C at position 1245 in the HSD3B1 gene or expresses a 367N version of the 3β-HSD1 protein; and b) treating the subject with a non-corticosteroid.

In certain embodiment, the it is determined (or the report indicates) that the subject is C/C at position 1245 in the HSD3B1 gene. In some embodiments, it is determined (or the report indicates) that the subject is C/A at position 1245 in the HSD3B1 gene. In further embodiments, it is determined (or the report indicates) that the subject is A/A at position 1245 in the HSD3B1 gene. In further embodiments, it is determined (or the report indicates) that the subject expresses a 367N version of the 3β-HSD1 protein. In other embodiments, it is determined (or the report indicates) that the subject expresses only a 367T version of the 3β-HSD1 protein.

In certain embodiments, the corticosteroid is a glucocorticoid. In some embodiments, the glucocorticoid is an inhaled glucocorticoid. In further embodiments, the inhaled glucocorticoid is high dose glucocorticoid (e.g., prescribed or administered as in a high dose, such as fluticasone over 440 micrograms/day for a human, or equivalent for some other inhaled glucocorticoid). In some embodiments, the corticosteroid is selected from the group consisting of: hydrocortisone, prednisone, prednisolone, methylprednisolone, and dexamethasone. In other embodiments, the non-corticosteroid is a non-glucocorticoid. In further embodiments, the non-corticosteroid agent comprises an androgen, DHEA (e.g., for human females), DHEA-S, testosterone (e.g., for human males), DHT, and androstenedione. In some embodiments, the sample comprises a sample type selected from: urine, saliva, serum, plasma, tissue biopsy, and whole blood.

DESCRIPTION OF THE FIGURES

The patent or application file contains at least one drawing executed in color. Copies of this patent or patent application publication with color drawings will be provided by the Office upon request and payment of the necessary fee.

FIG. 13 shows there is no association between genotype and neutrophil count in patients not treated with oral glucocorticoids. In patients treated with oral glucocorticoids, there is a significant decrease in neutrophil count in the homozygous HSD3B1 (1245C) group ($p=0.02$).

DETAILED DESCRIPTION

Figure 1:
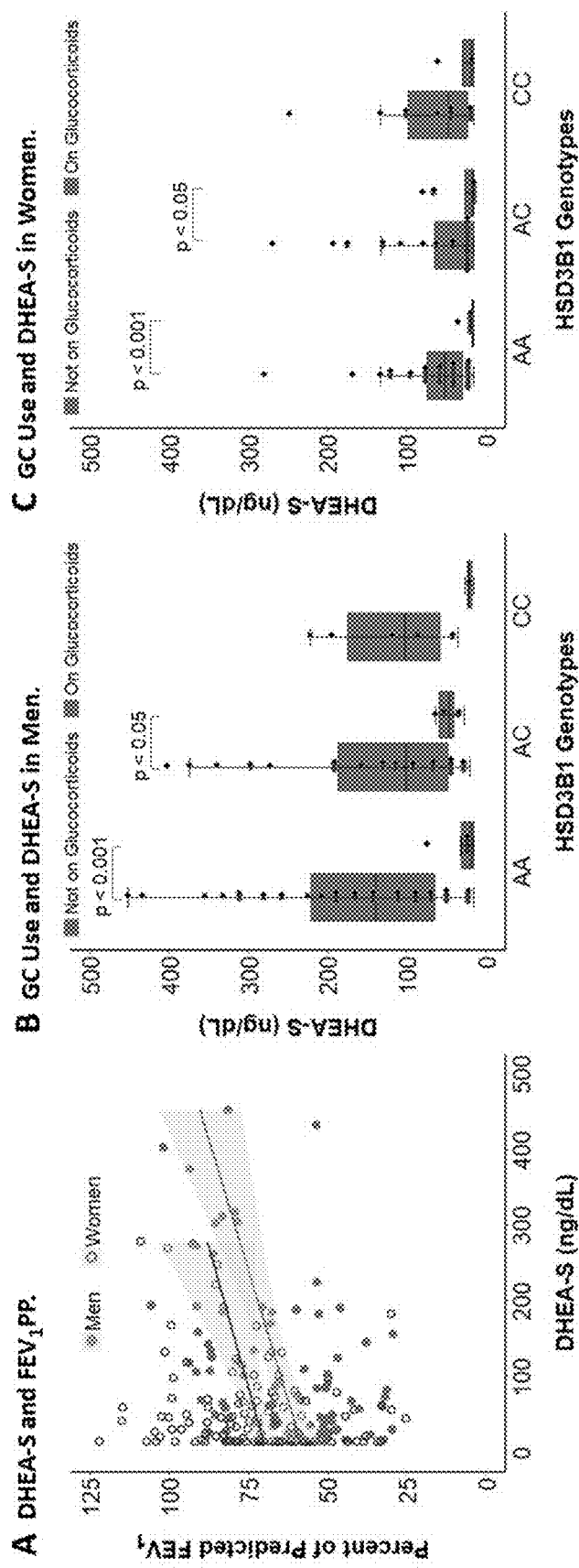
FIG. 1. DHEA-S concentration is associated with $FEV_1PP$ and suppressed with daily systemic GC use. Panel A, in subjects with asthma, $FEV_1PP$ correlates significantly with DHEA-S levels in both Caucasian men (blue circles; $R^2=0.15$; $p<0.001$) and women (open red circles; $R^2=0.03$; $p=0.047$). Panel B and C, Chronic daily GC use is associated with DHEA-S suppression irrespective of HSD3B1 genotype in SARP III in men and women.

The present invention relates to methods, kits, and compositions for testing a sample from a subject with asthma to determine: i) if the subject is A/A or A/C at position 1245 in the HSD3B1 gene, and/or if the subject expresses a 367N version of the 3β-HSD1 protein (e.g., and should be administered a non-corticosteroid for their asthma), or ii) if the subject is C/C at position 1245 in the HSD3B1 gene, and/or if the subject expresses only the 367T version of the 3β-HSD1 protein (e.g., and should be administered a corticosteroid for their asthma). In certain embodiments, the corticosteroid is a glucocorticoid.

Since their discovery and introduction into clinical medicine about 70 years ago, glucocorticoids (GC) have been recognized to elicit a systemic anti-inflammatory response, and currently play a major role in the treatment of severe asthma and other inflammatory disease processes. However, unresponsiveness to GC treatment is a major barrier to treatment of inflammatory disease processes, and the underlying mechanisms of this clinical entity have yet to be clearly elucidate. Management of GC-unresponsive disease represents a significant challenge for the treatment of asthma. Indeed, severe asthma is generally defined as asthma that remains symptomatic despite high-dose inhaled GC and/or systemic GC therapy.

Suppression of endogenous adrenal androgens and cortisol is a known consequence of systemic GC treatment. Substantial evidence suggests that stimulation of the androgen receptor (AR) expressed in the lung could be beneficial in asthma. Androgens inhibit human airway smooth muscle and fibroblast proliferation, promote airway smooth muscle relaxation and inhibit both Th2 and Th1 inflammation in animal models of asthma. Androgens are associated with better lung function in large healthy cohorts and in asthma.

Increasing circulating levels of adrenal and gonadal androgens in males and females during adolescence are associated with improving asthma during adolescence. However, the role of GC-induced androgen suppression in the pathophysiology of severe, GC resistant human asthma is not established.

The androgen dehydroepiandrosterone (DHEA) and its sulfate (DHEA-S) are secreted from the adrenal reticularis and together are the most abundant steroid in circulation. However, its function is not known. DHEA-S may have an immunomodulatory effect, but clinical results have been inconsistent, possibly because variations in DHEA-S metabolism are generally not taken into account. In peripheral tissues, DHEA is metabolized by the enzyme 3β-hydroxysteroid dehydrogenase-1 (3β-HSD1; encoded by HSD3B1) to potent downstream androgens (e.g., testosterone and dihydrotestosterone). A common missense-encoding variant in HSD3B1, rs1047303 (c.1245C>A, p.T367N), regulates biochemical function and clinical phenotypes. The HSD3B1 (1245A) allele encodes for an adrenal restrictive enzyme that limits conversion from DHEA to downstream androgens, whereas the HSD3B1 (1245C) allele encodes for an adrenal permissive enzyme that results in increased metabolic flux from DHEA to more potent androgens. Multiple studies from the US, Japan and Spain, now further confirmed in a phase III clinical trial, clearly show that men with advanced prostate cancer treated with castration who inherit the adrenal permissive 3β-HSD1 enzyme which confers more rapid conversion from DHEA to potent androgens have more rapid onset of androgen-driven disease progression. These studies establish that clear clinical phenotype(s) are associated with HSD3B1 genotypes that biochemically confer fast and slow metabolic flux to potent androgens. While the present invention is not limited to any particular mechanism, it believed that the restrictive HSD3B1 genotype that disables DHEA-S conversion to potent androgens impairs $FEV_1PP$ specifically when GC treatment suppresses adrenal DHEA-S production, limiting substrate availability for 3β-HSD1 and possibly providing a mechanistic explanation for GC-resistant severe asthma in patients with this genotype.

The present disclosure is not limited with regard to how position 1245 in the HSD3B1 gene is detected to see if a subject has one or two alleles of 1245C or one or two alleles of 1245A. In some embodiments, detection involves measurement or detection of a characteristic of a non-amplified nucleic acid, amplified nucleic acid, a component comprising amplified nucleic acid, or a byproduct of the amplification process, such as a physical, chemical, luminescence, or electrical aspect, which correlates with amplification (e.g. fluorescence, pH change, heat change, etc.). In some embodiments, fluorescence detection methods are provided for detection of amplified or non-amplified HSD3β1 nucleic acid. In certain embodiments, various detection reagents, such as fluorescent and non-fluorescent dyes and probes are employed. For example, the protocols may employ reagents suitable for use in a TaqMan reaction, such as a TaqMan probe; reagents suitable for use in a SYBR Green fluorescence detection; reagents suitable for use in a molecular beacon reaction, such as molecular beacon probes; reagents suitable for use in a scorpion reaction, such as a scorpion probe; reagents suitable for use in a fluorescent DNA-binding dye-type reaction, such as a fluorescent probe; and/or reagents for use in a LightUp protocol, such as a LightUp probe. In some embodiments, provided herein are methods and compositions for detecting and/or quantifying a detectable signal (e.g. fluorescence) from HSD3β1 target nucleic acid. Thus, for example, methods may employ labeling (e.g. during amplification, post-amplification) amplified nucleic acids with a detectable label, exposing partitions to a light source at a wavelength selected to cause the detectable label to fluoresce, and detecting and/or measuring the resulting fluorescence. Fluorescence emitted from label can be tracked during amplification reaction to permit monitoring of the reaction (e.g., using a SYBR Green-type compound), or fluorescence can be measure post-amplification. In some embodiments, the 1245 position in HSD3B1 is detected with methods described in U.S. Pat. No. 9,856,536, which is herein incorporated by reference in its entirety.

In some embodiments, detection of HSD3B1 nucleic acids employs one or more of fluorescent labeling, fluorescent intercalation dyes, FRET-based detection methods (U.S. Pat. No. 5,945,283; PCT Publication WO 97/22719; both of which are incorporated by reference in their entireties), quantitative PCR, real-time fluorogenic methods (U.S. Pat. No. 5,210,015 to Gelfand, U.S. Pat. No. 5,538,848 to Livak, et al., and 5,863,736 to Haaland, as well as Heid, C. A., et al., Genome Research, 6:986-994 (1996); Gibson, U. E. M, et al., Genome Research 6:995-1001 (1996); Holland, P. M., et al., Proc. Natl. Acad. Sci. USA 88:7276-7280, (1991); and Livak, K. J., et al., PCR Methods and Applications 357-362 (1995), each of which is incorporated by reference in its entirety), molecular beacons (Piatek, A. S., et al., Nat. Biotechnol. 16:359-63 (1998); Tyagi, S. and Kramer, F. R., Nature Biotechnology 14:303-308 (1996); and Tyagi, S. et al., Nat. Biotechnol. 16:49-53 (1998); herein incorporated by reference in their entireties), Invader assays (Third Wave Technologies, (Madison, Wis.)) (Neri, B. P., et al., Advances in Nucleic Acid and Protein Analysis 3826: 117-125, 2000; herein incorporated by reference in its entirety), nucleic acid sequence-based amplification (NASBA; (See, e.g., Compton, J. Nucleic Acid Sequence-based Amplification, Nature 350:91-91, 1991; herein incorporated by reference in its entirety), Scorpion probes (Thelwell, et al. Nucleic Acids Research, 28:3752-3761, 2000; herein incorporated by reference in its entirety), partially double-stranded linear probes (Luk, K.-C., et al, J. Virological Methods 144:1-11, 2007; herein incorporated by reference in its entirety), capacitive DNA detection (See, e.g., Sohn, et al. (2000) Proc. Natl. Acad. Sci. U.S.A. 97:10687-10690; herein incorporated by reference in its entirety), etc.

Target HSD3β1 nucleic acid molecules (e.g., amplified HSD3β1 nucleic acid) may be analyzed by any number of techniques to determine the presence of, amount of, or identity of the molecule. Non-limiting examples include sequencing, mass determination, and base composition determination. The analysis may identify the sequence of all or a part of the amplified nucleic acid (e.g., containing the 1245 position) or one or more of its properties or characteristics to reveal the desired information. Illustrative non-limiting examples of nucleic acid sequencing techniques include, but are not limited to, chain terminator (Sanger) sequencing and dye terminator sequencing, as well as "next generation" sequencing techniques. A number of DNA sequencing techniques are known in the art, including fluorescence-based sequencing methodologies (See, e.g., Birren et al., Genome Analysis: Analyzing DNA, 1, Cold Spring Harbor, N.Y.; herein incorporated by reference in its entirety). In some embodiments, automated sequencing techniques understood in that art are utilized. In some embodiments, the systems, devices, and methods employ parallel sequencing of partitioned amplicons (PCT Publication No: WO2006084132 to Kevin McKernan et al., herein incorporated by reference in its entirety). In some embodiments, DNA sequencing is achieved by parallel oligonucleotide extension (See, e.g., U.S. Pat. No. 5,750,341 to Macevicz et al., and U.S. Pat. No. 6,306,597 to Macevicz et al., both of which are herein incorporated by reference in their entireties). Additional examples of sequencing techniques include the Church polony technology (Mitra et al., 2003, Analytical Biochemistry 320, 55-65; Shendure et al., 2005 Science 309, 1728-1732; U.S. Pat. Nos. 6,432,360, 6,485, 944, 6,511,803; herein incorporated by reference in their entireties) the 454 picotiter pyrosequencing technology (Margulies et al., 2005 Nature 437, 376-380; US20050130173; herein incorporated by reference in their entireties), the Solexa single base addition technology (Bennett et al., 2005, Pharmacogenomics, 6, 373-382; U.S. Pat. Nos. 6,787,308; 6,833,246; herein incorporated by reference in their entireties), Illumina Single base sequencing technology, the Lynx massively parallel signature sequencing technology (Brenner et al. (2000). Nat. Biotechnol. 18:630-634; U.S. Pat. Nos. 5,695,934; 5,714,330; herein incorporated by reference in their entireties) and the Adessi PCR colony technology (Adessi et al. (2000). Nucleic Acid Res. 28, E87; WO 00018957; herein incorporated by reference in its entirety).

The present disclosure is not limited with the methods used to determine if the human 3β-HSD1 protein has a threonine at position 367 (367T) or an asparagine at position 367 (367N), and not limited by the methods used to determine the amount of 367T that is expressed. For example, these HSD3B1 variants can be measured using any suitable methodology, including but not limited, to mass spectrometry, HPLC/UV, HPLC/Vis, LC/MS/MS, immunological detection methods. In other embodiments, the variants of HSD3β1 are measured using: 1) a sandwich immunoassay (e.g., monoclonal, polyclonal and/or DVD-Ig sandwich immunoassays or any variation thereof (e.g., monoclonal/DVD-Ig or DVD-Ig/polyclonal), including chemiluminescence detection, radioisotope detection (e.g., radioimmunoassay (RIA)) and enzyme detection (e.g., enzyme immunoassay (EIA) or enzyme-linked immunosorbent assay (ELISA) (e.g., Quantikine ELISA assays, R&D Systems, Minneapolis, Minn.))), 2) a competitive inhibition immunoassay (e.g., forward and reverse), 3) a fluorescence polarization immunoassay (FPIA), 4) an enzyme multiplied immunoassay technique (EMIT), 5) a bioluminescence resonance energy transfer (BRET), 6) a homogeneous chemiluminescent assay, 7) a SELDI-based immunoassay, 8) chemiluminescent microparticle immunoassay (CMIA) and 9) a clinical chemistry colorimetric assay (e.g., IMA, creatinine for eGFR determination and LC-MS/MS). (See, e.g., Tietz Textbook of Clinical Chemistry and Molecular Diagnostics. 4th Edition, edited by C A Burtis, ER Ashwood and D E Bruns, Elsevier Saunders, St. Louis, Mo., 2006). In certain embodiments, the methods described in U.S. Pat. No. 9,856, 535 (herein incorporated by reference) are employed.

Further, if an immunoassay is being utilized, any suitable detectable label as is known in the art can be used. For example, the detectable label can be a radioactive label (such as 3H, 125I, 35S, 14C, 32P, and 33P), an enzymatic label (such as horseradish peroxidase, alkaline peroxidase, glucose 6-phosphate dehydrogenase, and the like), a chemiluminescent label (such as acridinium esters, thioesters, or sulfonamides; luminol, isoluminol, phenanthridinium esters, and the like), a fluorescent label (such as fluorescein (e.g., 5-fluorescein, 6-carboxyfluorescein, 3'6-carboxyfluorescein, 5 (6)-carboxyfluorescein, 6-hexachloro-fluorescein, 6-tetrachlorofluorescein, fluorescein isothiocyanate, and the like)), rhodamine, phycobiliproteins, R-phycoerythrin, quantum dots (e.g., zinc sulfide-capped cadmium selenide), a thermometric label, or an immuno-polymerase chain reaction label. An introduction to labels, labeling procedures and detection of labels is found in Polak and Van Noorden, Introduction to Immunocytochemistry, 2nd ed., Springer Verlag, N.Y. (1997), and in Haugland, Handbook of Fluorescent Probes and Research Chemicals (1996), which is a combined handbook and catalogue published by Molecular Probes, Inc., Eugene, Oreg. A fluorescent label can be used in FPIA (see, e.g., U.S. Pat. Nos. 5,593,896, 5,573,904, 5,496,925, 5,359,093, and 5,352,803, which are hereby incorporated by reference in their entireties). An acridinium compound can be used as a detectable label in a homogeneous or heterogeneous chemiluminescent assay (see, e.g., Adamczyk et al., Bioorg. Med. Chem. Lett. 16:1324-1328 (2006); Adamczyk et al., Bioorg. Med. Chem. Lett. 4:2313-2317 (2004); Adamczyk et al., Biorg. Med. Chem. Lett. 14:3917-3921 (2004); and Adamczyk et al., Org. Lett. 5:3779-3782 (2003)).

In certain embodiments, as part of the methods of the present invention, a patient is administered or recommended for administration of a therapeutic agent. Examples of such agents include, for example: Mepolizumab/Nucala (GSK anti-IL5); Reslizumab (Cinquil™, Teva Pharmaceuticals; formerly SCH-55700 anti-IL5); Benralizumab (a humanized afucosylated IgG1κ mAb to human IL-5Rα); Lebrikizumab (anti-IL-13, Genentech/Chugai Pharmaceutical); Tralokinumab (CAT-354, MedImmune; an injectable anti-IL-13 humanized IgG4 mAb); a recombinant human IL-4 variant called pitrakinra (Aerovant™, Aerovance; which competitively inhibits the IL-4Rα receptor complex to interfere with the actions of both IL-4 and IL-13); Dupilumab (SAR231893/REGN668; which is a fully humanized mAb to the IL-4Rα/IL-13Rα1 receptor complex that inhibits both IL-4 and IL-13 signaling); a leukotriene receptor antagonist (LTRA); a steroidal drug; and a non-steroidal drug (e.g., as shown in Table 3). In certain embodiments, the therapeutic agent is a TH2-targeted biologic therapy, such as those targeting pathways of: IL4, IL5, IL13, IL17/25. In some embodiments, anti-IgE therapy is employed. Additional examples of therapeutic agents (e.g., for treating an eosinophilic disorder) include, but are not limited to: corticosteroids (e.g., prednisone), Flovent, and budesonide.

TABLE 3

Non-Corticosteroid Dugs

| Generic Name | Chemical Name | Brand Name | Type |
|---|---|---|---|
| Albuterol Sulfate | α1 [(tert-butylamino) methyl]-4-hydroxy-m-xylene-α, α'-diol sulfate (2:1) (salt) | VoSpireER Extended Release Tablets | LABA - recommended with use with steroids |
| Formoterol fumarate | ±)-2-hydroxy-5-[(1RS)-1-hydroxy-2-[[(1RS)-2-(4-methoxyphenyl)-1methylethyl]- | Foradil Aerolizer | LABA - recommended |

TABLE 3-continued

Non-Corticosteroid Drugs

| Generic Name | Chemical Name | Brand Name | Type |
|---|---|---|---|
| | amino]ethyl]formanilide fumarate dihydrate | | with use with steroids |
| Salmeterol Xinafoate | ±-4-Hydroxy-a1 -[[[6-(4-phenylbutoxy)hexyl]amino]methyl]-1,3-benzenedimethanol compd. with 1-hydroxy-2-naphthalenecarboxylic acid (1:1) | Serevent Diskus | LABA - recommended with use with steroids |
| Albuterol Sulfate HFA | α1-[(tertbutylamino) methyl]-4-hydroxy-m-xylene-α, α'-diol sulfate (2:1) (salt) | ProAir HFA, Proventil HFA, Ventolin HFA | SABA - rescue medicine |
| Albuterol Sulfate Inhalation Solution | α1 [(tert-butylamino) methyl]-4-hydroxy-m-xylene-α, α'-diol sulfate (2:1) (salt) | | SABA - rescue medicine |
| Albuterol Sulfate Nebulizer Soluction | α1 [(tert-butylamino) methyl]-4-hydroxy-mxylene-α, α'-diol sulfate (2:1) (salt) | AccuNeb Inhalation Solution, Albuterol Sulfate 0.5% | SABA - rescue medicine |
| Ipratropium Bromide in combination with Albuterol Sulfate | [8-methyl-8-(1-methylethyl)- 8-azoniabicyclo[3.2.1] oct-3-yl] 3-hydroxy-2-phenyl-propanoate [and] α1 [(tert-butylamino) methyl]-4-hydroxy-mxylene-α, α'-diol sulfate (2:1) (salt) | Combivent; DuoNeb | Anticholinergic |
| Ipratropium Bromide HFA | [8-methyl-8-(1-methylethyl)- 8-azoniabicyclo[3.2.1] oct-3-yl] 3-hydroxy-2-phenyl-propanoate | Atrovent, Apovent and Aerovent | Anticholinergic |
| Levalbuterol HCl | (R)-α1-[[(1,1-dimethylethyl)amino]methyl]-4-hydroxy-1,3-benzenedimethanol hydrochloride | Xopenex; Xopenex HFA | SABA - rescue medicine |
| Pirbuterol | (RS)-6-[2-(tert-butylamino)-1-hydroxyethyl]-2-(hydroxymethyl)pyridin-3-ol | Maxair Autoinhaler | SABA - rescue medicine |
| Tiotropium Bromide Inhalation Powder | (1α, 2β, 4 β, 5α, 7β)-7-[(Hydroxydi-2-thienylacetyl)oxy]-9,9-dimethyl-3-oxa-9-azoniatricyclo[3.3.1.02,4]nonane bromide monohydrate | Spiriva HandiHaler | SABA - rescue medicine |
| Terbutaline | (RS)-5-[2-(tert-butylamino)-1-hydroxyethyl]benzene-1,3-diol | Brethine, Bricanyl, Brethaire, Terbulin | SABA - rescue medicine |
| Cromolyn Sodium | disodium 5,5'-[(2-hydroxytrimethylene)dioxy]bis[4-oxo-4H-1-benzopyran-2-carboxylate] | Intal, Intal Metered Dose Inhaler | Non-steroid anti-inflammatory |
| Theophylline | 1H-Purine-2,6-dione,3,7-dihydro,1,3 -dimethyl- | Uniphyl, Elixophyllin, Theo-24, Theo-Time, Theochron | Non-steroid anti-inflammatory |
| Montelukast | (S,E)-2-(1-((1-(3-(2-(7-chloroquinolin-2-yl)vinyl)phenyl)-3-(2-(2-hydroxypropan-2-yl)phenyl)propylthio)methyl)cyclopropyl)acetic acid | Singular, Montelo-10 | Leukotriene receptor antagonist (LTRA) |
| Zafirlukast | cyclopentyl 3-{2-methoxy-4-[(o-tolylsulfonyl)carbamoyl]benzyl}-1-methyl-1H-indol-5-ylcarbamate | Accolate, Accoleit, Vanticon | Leukotriene receptor antagonist (LTRA) |
| Zileuton | N-[1-(1-benzothien-2-yl)ethyl]-N -hydroxyurea | Zyflo, Zyflo CR | Leukotriene receptor antagonist (LTRA) |
| Omalizumab | Accession Number DB00043 | Xolair | Humanized Antibody |
| Dyphylline | 7-(2,3-dihydroxypropyl)-theophylline | Lufyllin | Broncodilator |
| Dyphylline in combination with Guaifenesin | 7-(2,3-dihydroxypropyl)-theophylline [and] (RS)-3-(2-methoxyphenoxy)propane-1,2-diol | Lufyllin COPD; Lufyllin-GG | Broncodilator and expectorant |

EXAMPLES

Example 1

Asthma resistance to glucocorticoid treatment is a major health problem with unclear etiology. Glucocorticoids inhibit adrenal androgen production. However, androgens have potential benefits in asthma. HSD3B1 encodes for 3β-hydroxysteroid dehydrogenase-1 (3β-HSD1), which catalyzes peripheral conversion from adrenal dehydroepiandrosterone (DHEA) to potent androgens and has a germline missense-encoding polymorphism. The adrenal restrictive HSD3B1 (1245A) allele limits conversion, whereas the adrenal permissive HSD3B1 (1245C) allele increases DHEA metabolism to potent androgens.

As described in more detail below, in the Severe Asthma Research Program (SARP) III cohort, we determined the association between DHEA-sulfate and percent predicted forced expiratory volume in 1 second ($FEV_1PP$). HSD3B1 (1245) genotypes were assessed and association between adrenal restrictive and adrenal permissive alleles and $FEV_1PP$ in patients with (GC) and without (noGC) daily oral glucocorticoid treatment was determined (n=318). Validation was performed in a second cohort (SARP I&II; n=184).

Briefly, the results show DHEA-sulfate is associated with $FEV_1PP$ and is suppressed with GC treatment. GC patients homozygous for the adrenal restrictive genotype have lower $FEV_1PP$ compared with noGC (54.3% vs. 75.1%; p<0.001). In patients with the homozygous adrenal permissive genotype there was no $FEV_1PP$ difference in GC vs. noGC patients (73.4% vs. 78.9%; p=0.39). Results were independently confirmed: $FEV_1PP$ for homozygous adrenal restrictive genotype in GC vs. noGC is 49.8 vs. 63.4; p<0.001 and for homozygous adrenal permissive genotype is 66.7 vs. 67.7; p=0.92. This work shows that the adrenal restrictive HSD3B1 (1245A) genotype is associated with GC resistance, while the permissive genotype (1245C) GC permissive. This effect appears to be driven by GC suppression of 3β-HSD1 substrate.

METHODS

Subjects

Individuals included in this analysis comprised a subset of 318 Caucasian (from 488 patients of all races) adults (age>18) with asthma enrolled in the SARP III study on whom genotyping data and pulmonary function testing were available. We only included Caucasian patients in our study because of the numbers of patients available for analysis and the higher adrenal permissive HSD3B1 (1245C) allele frequency of 30-40% in Caucasians, as opposed to approximately 8% in people of African descent.

SARP III, a network of 11 clinical research centers across the United States, recruited 713 participants with asthma between Nov. 1, 2012, and Oct. 1, 2015. Of those 713 initially recruited participants with asthma, 526 were adults (age>18), 60% had severe asthma as defined by the European Respiratory Society/American Thoracic Society criteria[3], and 17% (21% of adult Caucasians) were chronically treated with chronic oral and/or injectable GCs (i.e. systemic). The remaining 40% of patients with asthma did not meet the criteria for severe asthma and were classified as having non-severe asthma. Among the 89 (17%) adult subjects treated with systemic GCs in SARP III, 55 received daily oral GCs only, 15 received daily oral GCs with additional GC injections, and 19 received intermittent GC injections alone. In the group that received intermittent GC injections alone, the majority (14 participants) received one to three injections per year. The rest (5 subjects) received more than 6 injections per year. While the suppressive effect of GCs is predictable with chronic daily GC use, intermittent GC injections might have an inconsistent effect on adrenal suppression and, accordingly, participants receiving such therapy were excluded from the analysis. Patients were also excluded if they were pregnant or breast-feeding during the initial characterization period, had a history of premature birth (<35 weeks gestation), or had a diagnosis of any other chronic pulmonary disorder. All patients were not active smokers (past smokers should not have smoked within a year or exceeded 10 pack-years of tobacco use if >30 years of age; or <5 pack-years if <30 years of age) and were required to have evidence of bronchial hyperresponsiveness (defined as a PC20 methacholine value<16 mg/mL) or reversible airflow obstruction, as evidenced by an increase in FEV1 of 12% or greater after albuterol inhalation, ipratropium bromide inhalation, or both. Spirometry was performed according to the American Thoracic Society/European Respiratory Society guidelines. The 2012 Global Lung Initiative standard reference equations were used to predict spirometric reference values. DHEA-S levels were analyzed at the University of Virginia Center for Research in Reproduction Ligand Core Laboratory using the Siemens Immulite 2000 immunoassay system which has a lower limit of detection for DHEA-S of 15 µg/dL. Information on SARP III network, protocol and characterization procedures have been published previously.[26-28] All participants provided written informed consent.

In order to replicate primary findings, 184 Caucasian participants (from a total of 263 of all races) with severe asthma were selected from the SARP I&II cohorts. Similarly, SARP I&II is an NIH/NHLBI sponsored multicenter study that recruited patients with asthma between 2001 and 2012 from 9 sites in the United States and 1 in the United Kingdom. However, as compared to SARP III, asthmatics enrolled in SARP I&II were less likely to have severe asthma (40% vs. 60%). In contrast to SARP III, severe asthma was defined in SARP I&II according to the initial ATS workshop definition of severe asthma.

Statistical Analysis:

Whole-genome sequence (WGS) of 1,888 patients enrolled in SARP I, II & III were released by Trans-Omics for Precision Medicine (TOPMed) program (nhlbiwgs.org) in its genotype call sets freeze 6a version. WGS with a read depth of 38× was performed on blood DNA using Illumina HiSeq X technology. The TOPMed freeze 6a genotype call set includes 107,047 samples and 642M high quality variants genomewide, >7.6M coding variants, >350K loss-of-function variants. Genotype calling and quality control (QC) was performed by the Informatics Research Center (IRC) led by the University of Michigan.

Genotypes for variant rs1047303 (position chr1: 119514623 (build GRCh38.p12)) in SARP I, II&III were extracted with PLINK2[32,33] (cog-genomics.org/plink2). HSD3B1 genotypes were directly confirmed in 28 patients using a method previously validated with 100% match.

Student's t-test was used for two group comparisons of continuous normally distributed variables. The means of the 3 different genotype groups were compared using the analysis variance (ANOVA) test. Pairwise comparisons were done using Tukey-Kramer Honest Significant Differences (HSD) test. Otherwise, Wilcoxon's rank sum test or Kruskal-Wallis one-way ANOVA were used when normality assumptions were not met. Categorical variables were compared using a chi-square test. We assumed an additive model of inheritance, where predictor variables were an additive effect for the rs1047303 genotype (coded as the number of C alleles). Interaction terms were included between rs1047303 genetic variants and daily oral GC as the dependent variables of the pre-bronchodilator $FEV_1PP$ (pre-$FEV_1PP$) post-$FEV_1PP$. Models were fit under the assumption of a normal distribution for $FEV_1PP$. All statistical analyses were conducted with R, version 3.5.3 (R Project for Statistical Computing, Vienna, Austria). A p value<0.05 was considered as statistically significant because only one position was tested.

RESULTS

Baseline Characteristics

Baseline characteristics of Caucasian SARP III participants with asthma and SARP I&II participants with severe asthma are listed in Table 1.

TABLE 1

Baseline characteristics comparing the two SARP cohorts, SARP III vs. SARP I&II, stratified by HSD3B1(1245) genotypes*.

|  | SARP III | | | | SARP I& II | | | |
|---|---|---|---|---|---|---|---|---|
|  | AA | AC | CC | p value | AA | AC | CC | p value |
| n | 146 | 131 | 41 |  | 80 | 79 | 25 |  |
| Age - yr | 49.5 ± 14.5 | 48.7 ± 13.8 | 47.8 ± 14.2 | 0.762 | 43.3 ± 11.2 | 46.3 ± 13.6 | 42.7 ± 13.7 | 0.26 |
| Female sex - no. (%) | 92 (63.0) | 80 (61.1) | 31 (75.6) | 0.230 | 46 (57.5) | 47 (59.5) | 20 (80.0) | 0.11 |
| Body-mass index † | 30.2 ± 6.2 | 31.8 ± 8.6 | 33.4 ± 9.8 | 0.038 | 30.3 ± 7.2 | 30.5 ± 7.5 | 29.9 ± 6.9 | 0.93 |
| Daily oral GC therapy - n (%) | 23 (15.8) | 24 (18.3) | 8 (19.5) | 0.787 | 35 (43.8) | 30 (38.0) | 10 (40.0) | 0.76 |
| Severe asthma - n (%) ‡ | 82 (56.2) | 77 (58.8) | 20 (48.8) | 0.530 | 80 (100) | 79 (100) | 25 (100) |  |
| FEV1/FVC ratio | 0.84 ± 0.12 | 0.84 ± 0.12 | 0.90 ± 0.10 | 0.011 | 0.61 ± 0.13 | 0.64 ± 0.12 | 0.71 ± 0.11 | 0.026 |
| Pre-FEV1 - % of predicted value | 71.8 ± 19.3 | 72.6 ± 21.8 | 77.9 ± 16.3 | 0.224 | 57.4 ± 19.2 | 61.1 ± 21.6 | 67.3 ± 23.7 | 0.09 |
| Post-FEV1 - % of predicted value | 80.8 ± 20.2 | 80.3 ± 20.8 | 88.0 ± 16.5 | 0.083 | 73.5 ± 19.2 | 76.3 ± 20.7 | 79.3 ± 24.8 | 0.43 |

*Plus-minus values are means ± SD. FEV1 denotes forced expiratory volume in 1 second. FVC denotes forced vital capacity. Pre- denotes pre-bronchodilator. Post- denotes post-bronchodilator. GC denotes daily oral glucocorticoid therapy.
† The body-mass index is the weight in kilograms divided by the square of the height in meters.
‡ Analyzed SARP I&II cohort includes patients with severe asthma.

Aside from higher BMI in participants with the CC as compared to AA genotype enrolled in SARP III, patients with AA, AC and CC genotypes had similar baseline characteristics. Other than the CC genotype being associated with higher FEV1/FVC ratio compared with AA and AC, all other characteristics were not significantly different in participants with severe asthma enrolled in SARP I, II or III. DHEA-S levels did not vary by HSD3B1 (1245) genotype (p=0.52).

Baseline DHEA-S and $FEV_1PP$ $FEV_1PP$ was weakly associated with serum DHEA-S in both men and women. In the SARP III cohort, the $R^2$ (proportion of $FEV_1PP$ variability explained by DHEA-S) was 0.04 for all races (n=314; p<0.001) and 0.04 (n=203; p<0.001) for Caucasians. Similarly, for severe asthma in SARP I&II, the $R^2$ was 0.13 (n=271; p<0.001) for all races and 0.20 (n=178; p<0.001) in Caucasians (FIG. 1A). Strikingly, no women, and very few men, with DHEA-S levels over 200 ng/dL in either cohort had a baseline $FEV_1PP$ of less than 75% in SARP III.

DHEA-S Suppression is Associated with Oral GC Use

Daily oral GC therapy was commonly used in SARP III. Overall, 22.6% (29% of Caucasians) of adults with severe asthma enrolled in SARP III were treated with daily oral GC therapy[26]. Our analysis of DHEA-S from 314 adult participants with asthma enrolled in SARP III showed significantly lower plasma DHEA-S levels in patients treated with daily oral GC therapy as opposed to those not receiving daily oral GCs, for both men and women. Not surprisingly, DHEA-S decline occurs irrespective of HSD3B1 (1245) genotype (FIGS. 1B and 1C). Overall, daily GC therapy was associated with a 70% decrease in DHEA-S compared with no GC use in SARPIII and SARPI/II (p<0.001).

HSD3B1 (1245) Genotype and GC Resistance

To test our hypothesis that the HSD3B1 (1245A) adrenal restrictive allele is specifically associated with impaired lung function with GC-treatment-mediated adrenal suppression, lung function was compared in 318 GC and noGC Caucasian patients enrolled in SARP III on whom HSD3B1 (1245) genotype data was available. Statistical comparisons of GC and noGC $FEV_1PP$ by HSD3B1 (1245) genotype, before and after bronchodilation (BD), are summarized in Table 2 and graphical representations are in FIG. 2A-B.

TABLE 2

Comparison of maximum pre- and post-bronchodilator percent predicted forced expiratory volume in 1 second (max post-BD-FEV1 %) between patients treated with and without daily oral GCs among the HSD3B1(1245) AA, AC, and CC genotypes*.

|  | SARP III | | | SARP I & II | | |
|---|---|---|---|---|---|---|
| HSD3B1(1245) Genotype | Not on GC | On GC | p value | Not on GC | On GC | p value† |
| AA |  |  |  |  |  |  |
| n | 123 | 23 |  | 45 | 35 |  |
| Pre-FEV1 - % of predicted value | 75.1 ± 18.3 | 54.3 ± 15.3 | <0.001 | 63.4 ± 18.8 | 49.8 ± 17.1 | 0.001 |
| Post-FEV1 - % of predicted value | 83.9 ± 18.8 | 64.2 ± 19.6 | <0.001 | 73.5 ± 15.9 | 63.7 ± 18.4 | 0.024 |
| AC |  |  |  |  |  |  |
| n | 107 | 24 |  | 49 | 30 |  |
| Pre-FEV1 - % of predicted value | 75.6 ± 21.2 | 59.4 ± 19.8 | 0.001 | 66.9 ± 22.3 | 54.3 ± 18.3 | 0.008 |
| Post-FEV1 - % of predicted value | 83.2 ± 20.5 | 67.7 ± 17.9 | <0.001 | 77.2 ± 20.8 | 67.8 ± 20.3 | 0.07 |

TABLE 2-continued

Comparison of maximum pre- and post-bronchodilator percent predicted forced expiratory volume in 1 second (max post-BD-FEV1 %) between patients treated with and without daily oral GCs among the HSD3B1(1245) AA, AC, and CC genotypes*.

| HSD3B1(1245) Genotype | SARP III | | | SARP I & II | | |
|---|---|---|---|---|---|---|
| | Not on GC | On GC | p value | Not on GC | On GC | p value† |
| CC | | | | | | |
| n | 33 | 8 | | 15 | 10 | |
| Pre-FEV1 - % of predicted value | 78.9 ± 16.3 | 73.4 ± 16.6 | 0.41 | 67.7 ± 22.5 | 66.7 ± 26.6 | 0.92 |
| Post-FEV1 - % of predicted value | 89.2 ± 17.0 | 83.1 ± 14.4 | 0.32 | 78.2 ± 22.3 | 80.7 ± 16.2 | 0.76 |

*Data are presented as mean ± SD for continuous variables and proportions or percentages for categorical variables. FEV1 denotes forced expiratory volume in 1 second. FVC denotes forced vital capacity. Pre-denotes pre-bronchodilator. Post- denotes post-bronchodilator. GC denotes daily oral glucocorticoid therapy
†p value comparing daily oral GC vs. no GC in each genotype group AA, AC and CC Overall, pre- or post-FEV$_1$PP were not correlated with HSD3B1 (1245) genotype in the noGC group. However, an interaction was present between daily GC use and HSD3B1 (1245) genotype, suggesting that the effect of HSD3B1 (1245) genotype depends on daily GC use. In asthmatics homozygous for the HSD3B1 (1245A) adrenal restrictive allele, pre-BD-FEV$_1$PP (FIG. 2A) for GC treated individuals is significantly worse than noGC (54.3 vs. 75.1; p<0.001). Post-BD-FEV$_1$PP for GC treated individuals with the homozygous adrenal restrictive genotype (FIG. 2B) is similarly worse than noGC (64.2 vs. 83.9; p<0.001). In sharp contrast, for asthmatics homozygous for the HSD3B1 (1245C) adrenal permissive allele, the GC and noGC groups do not differ significantly for either pre-BD-FEV$_1$PP (73.4 vs. 78.9; p=0.41) or post-BD FEV$_1$PP (83.1 vs. 89.2; p=0.32). For asthmatics who inherit the heterozygous genotype, the association of poorer outcomes in GC vs. noGC groups, though smaller in effect compared with the homozygous adrenal restrictive genotype, persists for pre-BD-FEV$_1$PP (59.4 vs. 75.6; p=0.001) and post-BD-FEV$_1$PP (67.7 vs. 83.2; p<0.001). This relationship also holds when the results were stratified by gender.

Figure 2:
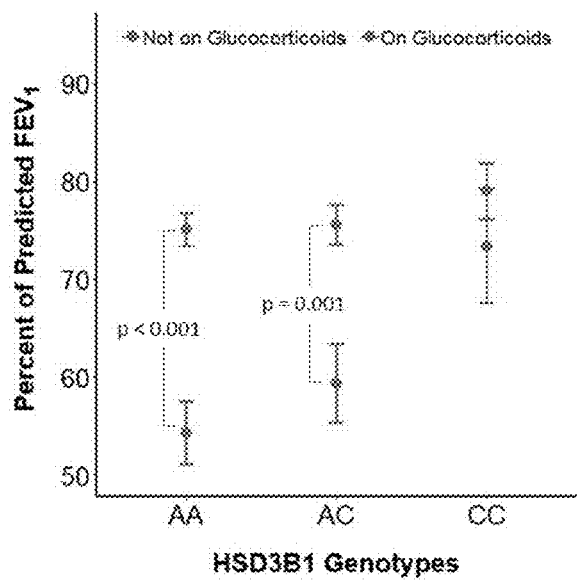
FIG. 2. The adrenal restrictive HSD3B1 (1245A) allele is specifically associated with poor pulmonary function in GC-treated severe asthmatics. In Caucasian AA genotype patients with asthma enrolled in SARP III, baseline pre-bronchodilator $FEV_1PP$ (Pre-BD $FEV_1PP$) (Panel A) and post-bronchodilator $FEV_1PP$ (Post-BD $FEV_1PP$) (Panel B) is lower for those in the GC vs. no GC treatment groups. In contrast, for the CC genotype there is no difference between GC and no GC treatment groups. Lower Pre-BD $FEV_1PP$ (Panel C) and Post-BD $FEV_1PP$ (Panel D) for AA genotype patients on GC also occurs in Caucasian patients with severe asthma enrolled in SARP I&II. Error bars indicate standard errors.
Figure 2:
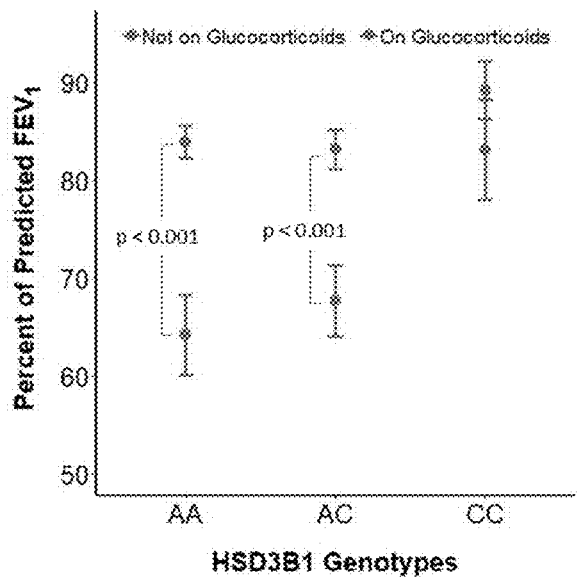
Figure 2:
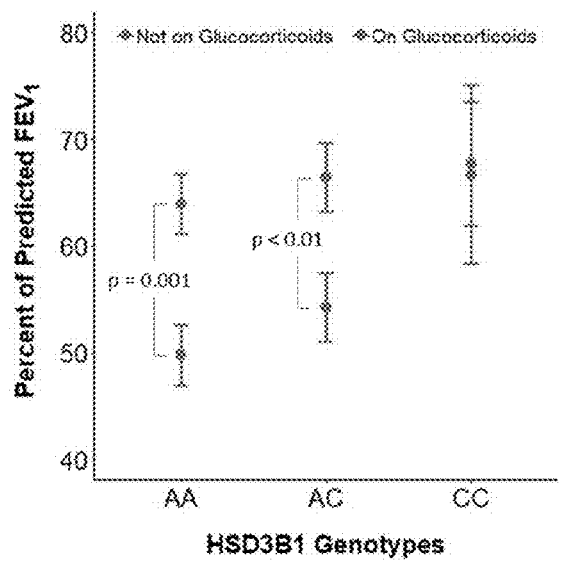
Figure 2:
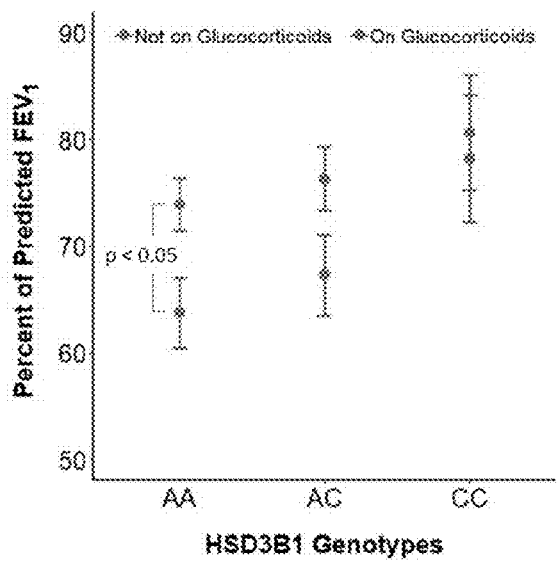
Figure 3:
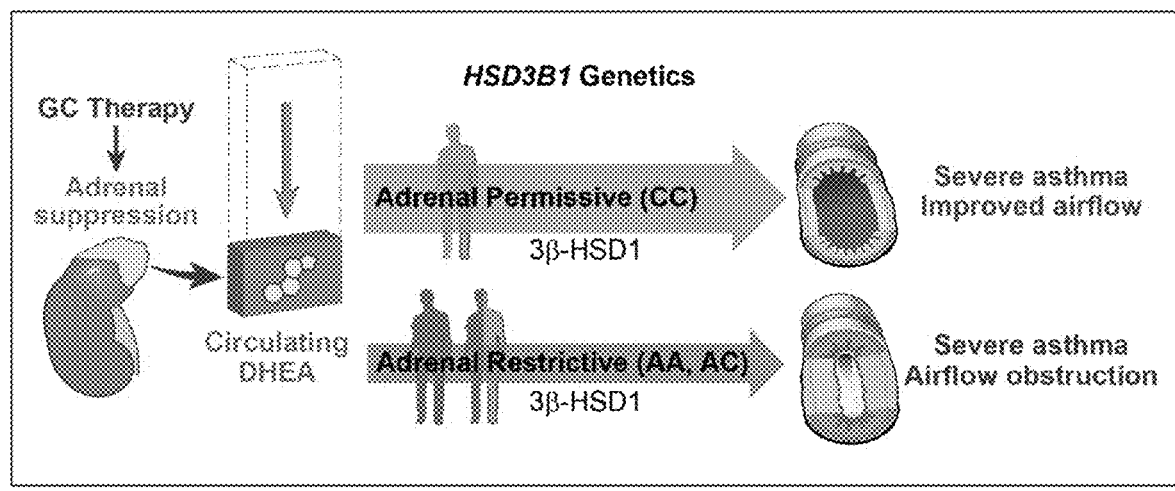
FIG. 3. A model that explains physiologic effects of HSD3B1 inheritance on $FEV_1PP$ in severe asthmatics. GC treatment suppresses adrenal DHEA, which may become a limiting substrate for 3β-HSD1, depending on HSD3B1 genotype. Adrenal permissive and adrenal restrictive alleles enable and limit metabolic flux through 3β-HSD1 and recovery of airflow.

To test the association between the HSD3B1 adrenal restrictive allele and lower FEV$_1$PP with oral GC treatment in a different cohort, we assessed 184 Caucasian patients with severe asthma in SARP I&II. Mirroring the results in SARP III, patients homozygous for the HSD3B1 (1245A) adrenal restrictive genotype in the GC group have significantly worse pre-BD-FEV$_1$PP (49.8 vs. 63.4; p<0.001) and post-BD-FEV$_1$PP (63.7 vs. 73.5; p<0.05) than noGC (FIGS. 2C and 2D). Patients homozygous for the HSD3B1 (1245C) adrenal permissive genotype have pre-BD-FEV$_1$PP and post-BD-FEV$_1$PP that are statistically indistinguishable between GC and noGC groups, effectively replicating the findings in SARP III. FEV$_1$PP for heterozygote patients are again intermediate between AA (adrenal restrictive) and CC (adrenal permissive) genotypes. A model that summarizes the effect of the association between HSD3B1 (1245) genotype, DHEA-S suppression with GC treatment and FEV$_1$PP is shown in FIG. 3.

Figure 4:
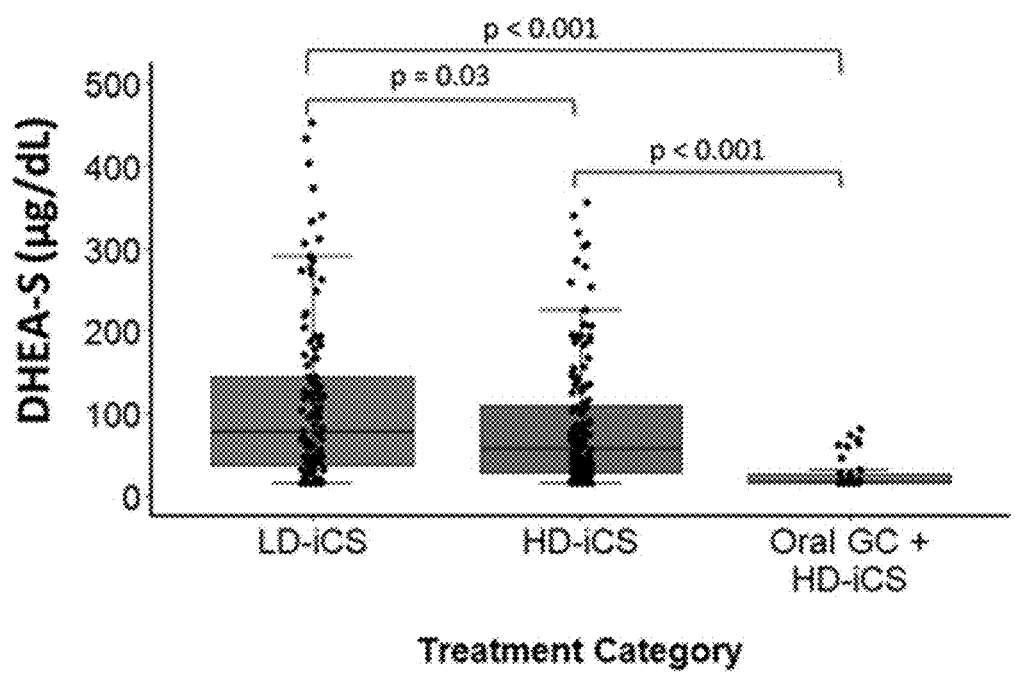
FIG. 4 shows DHEA-S suppression occurs with high-dose inhaled corticosteroid (HD-iCS) treatment compared with low-dose inhaled corticosteroid treatment (LD-iCS). DHEA-S is suppressed even further with oral glucocorticoid (GC) treatment. DHEA-S suppression results in limited substrate availability, specifically for HSD3B1 (1245A)-encoded enzymes.

In further work, data was gathered from patients taking high dose inhaled GCs. The magnitude of DHEA-S suppression with high-dose inhaled GCs is less than occurs with oral GCs (26% vs. 76% decline; p<0.001), as seen in the table 4 and FIG. 4.

TABLE 4

DHEA-S levels (µg/dL) by treatment category

| Rx_cat | Mean | SD | Median | IQR |
|---|---|---|---|---|
| LD-iCS | 110.5 | 100.9 | 76.5 | 107.2 |
| HD-iCS | 82.5 | 76.1 | 56.9 | 81.6 |
| Oral GC + HD-iCS | 26.3 | 20.1 | 14.9 | 11.5 |

Figure 5:
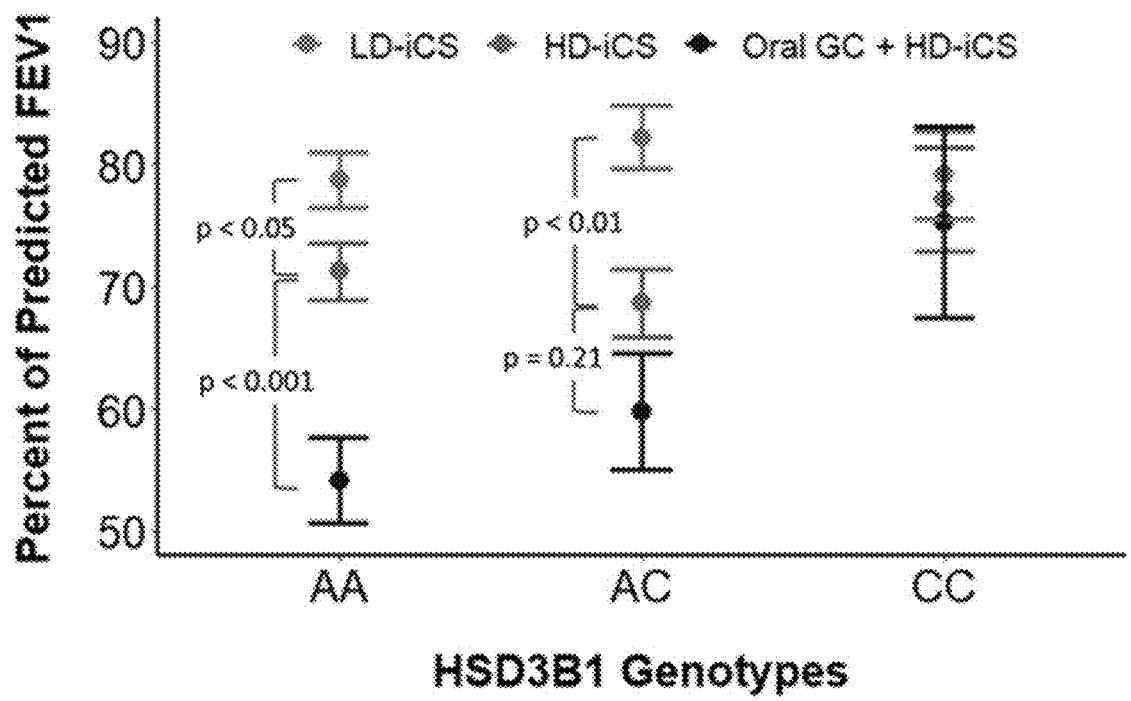
FIG. 5 shows the HSD3B1 (1245A) allele is associated with lower percent of predicted FEV1 for asthmatics treated with oral glucocorticoids (GCs) and to a lesser extent with HD-iCS treatment.
Figure 6:
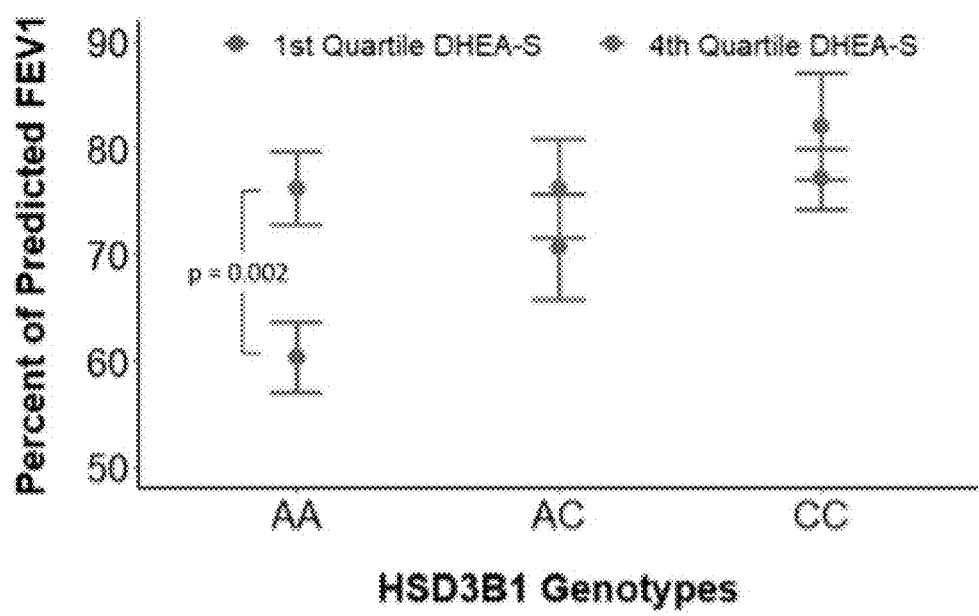
FIG. 6 shows the association between percent of predicted FEV1 with DHEA-S is driven by patients with low DHEA-S and the adrenal-restrictive HSD3B1 (1245A) allele. Shown is the comparison between those in the 1st and 4th quartile of DHEA-S.
Figure 7:
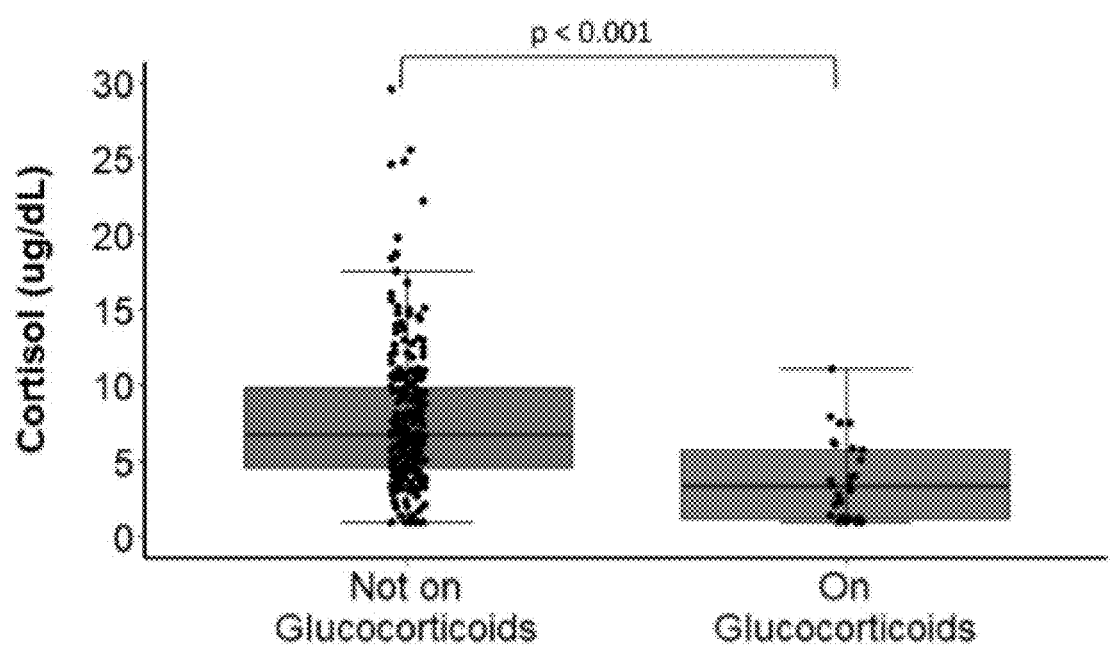
FIG. 7 shows that oral glucocorticoid treatment is associated with suppression of endogenous cortisol in circulation.
Figure 8:
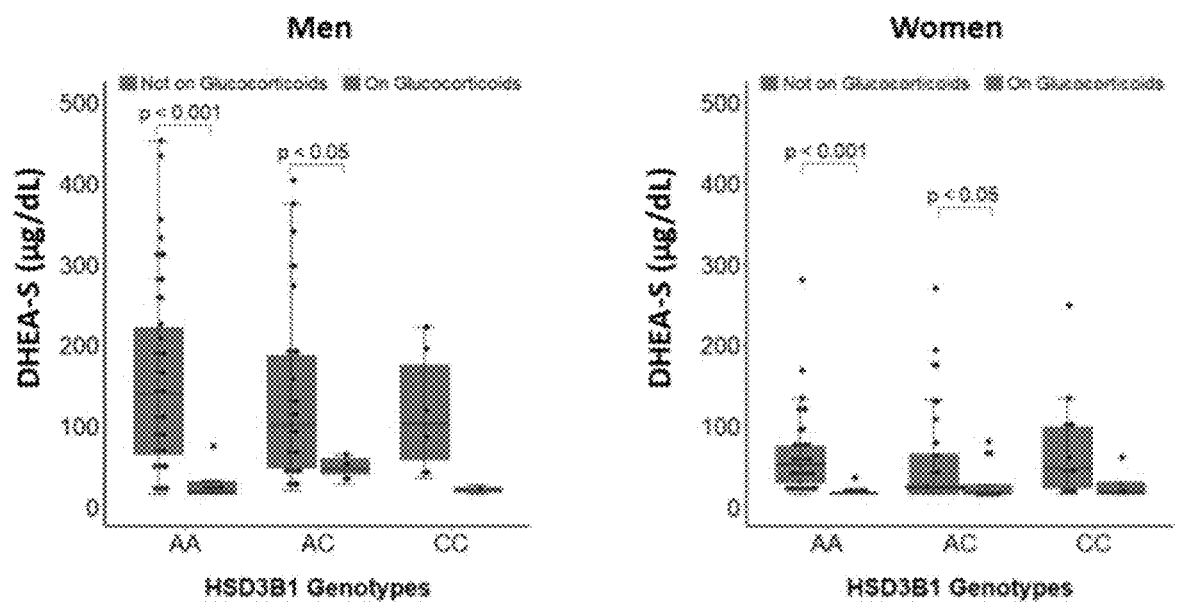
FIG. 8 shows that DHEA-S is suppressed with oral glucocorticoid treatment in men and women irrespective of HSD3B1 genotype.
Figure 9:
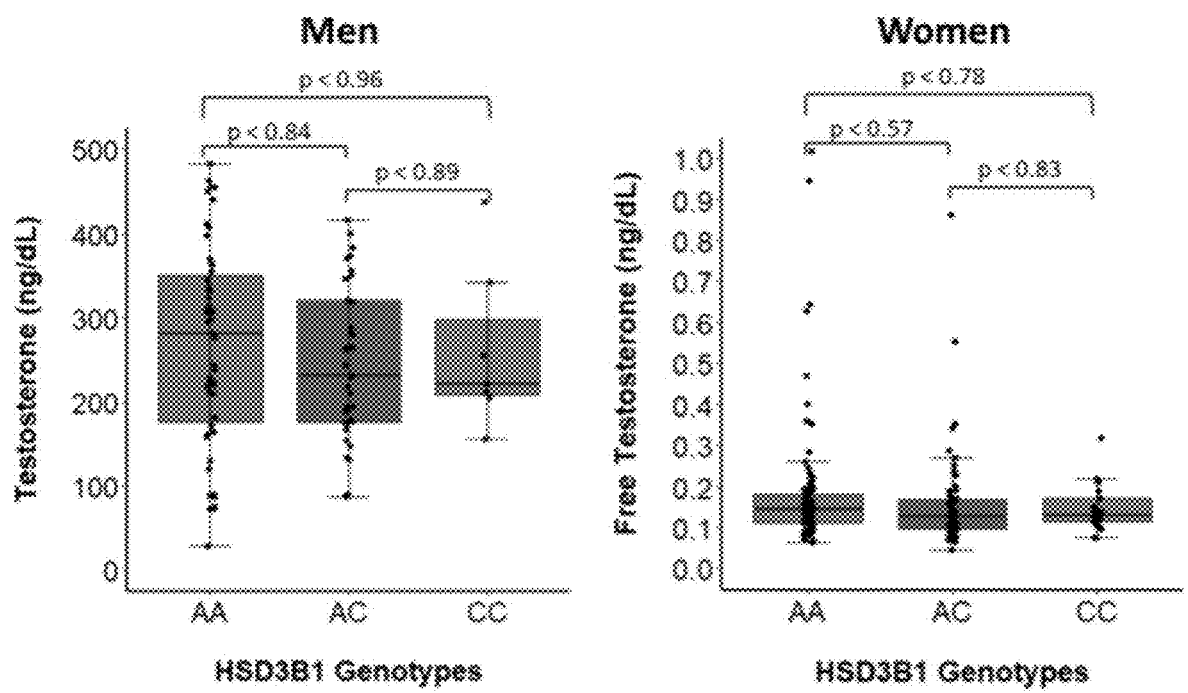
FIG. 9 shows no significant association exists between HSD3B1 genotype and circulating testosterone.
Figure 10:
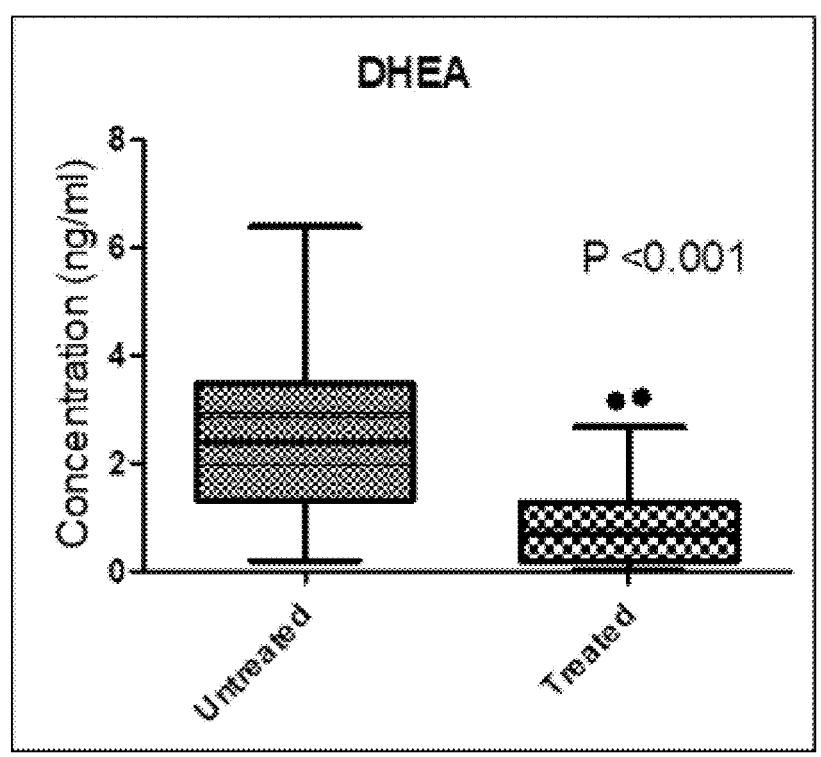
FIG. 10 shows oral glucocorticoid treatment (Treated) is associated with DHEA declines in comparison to severe asthmatics not treated with oral glucocorticoids (Untreated). The magnitude of decline is nearly identical to the DHEA-S decline. Median concentrations are 2.38 ng/ml and 0.66 ng/ml for Untreated and Treated groups, respectively.
Figure 11:
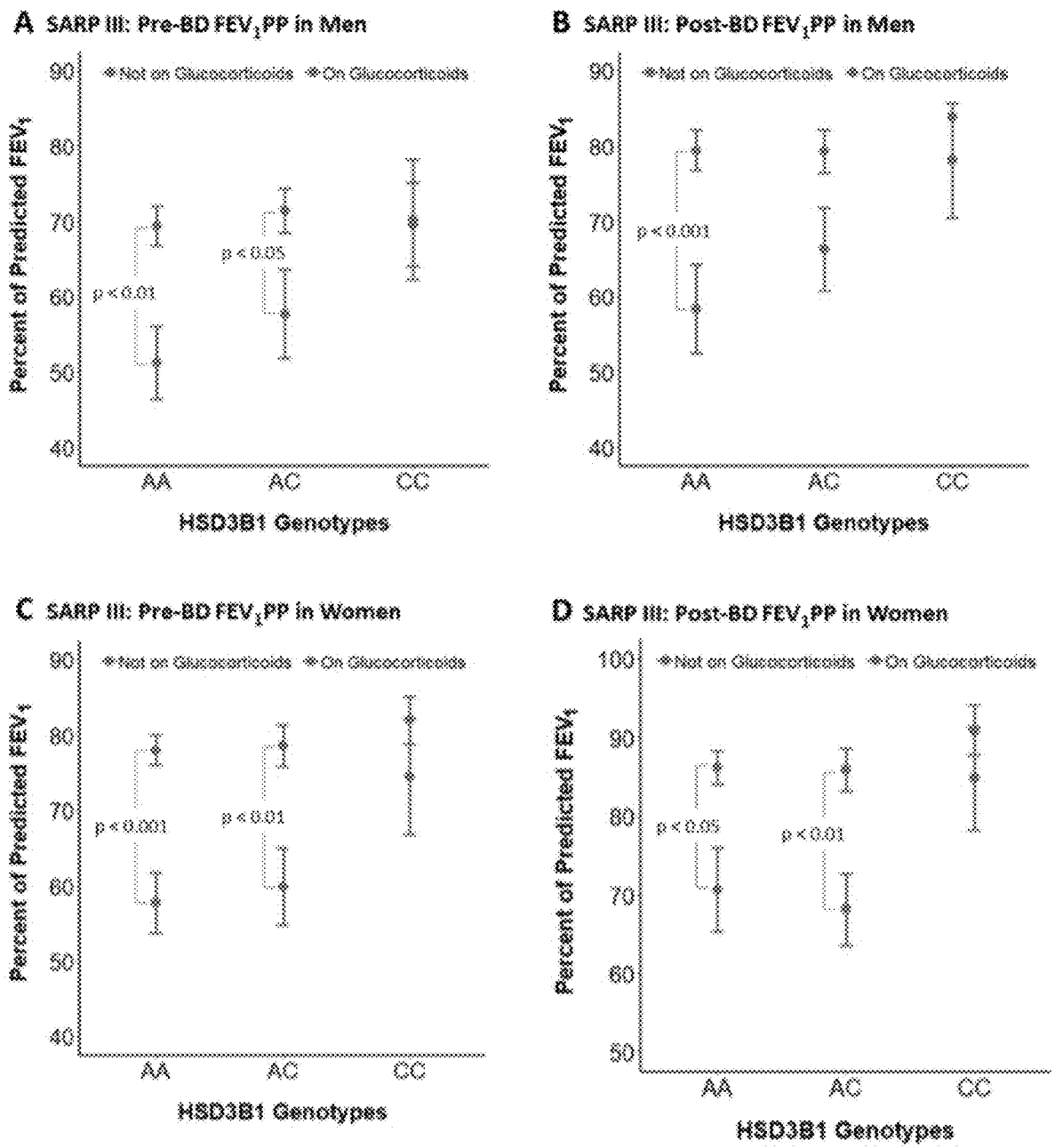
FIG. 11 shows the adrenal restrictive HSD3B1 (1245A) allele is associated with poor pulmonary function in GC-treated severe asthmatics in both adult Caucasian men and women enrolled in SARP III.
Figure 12:
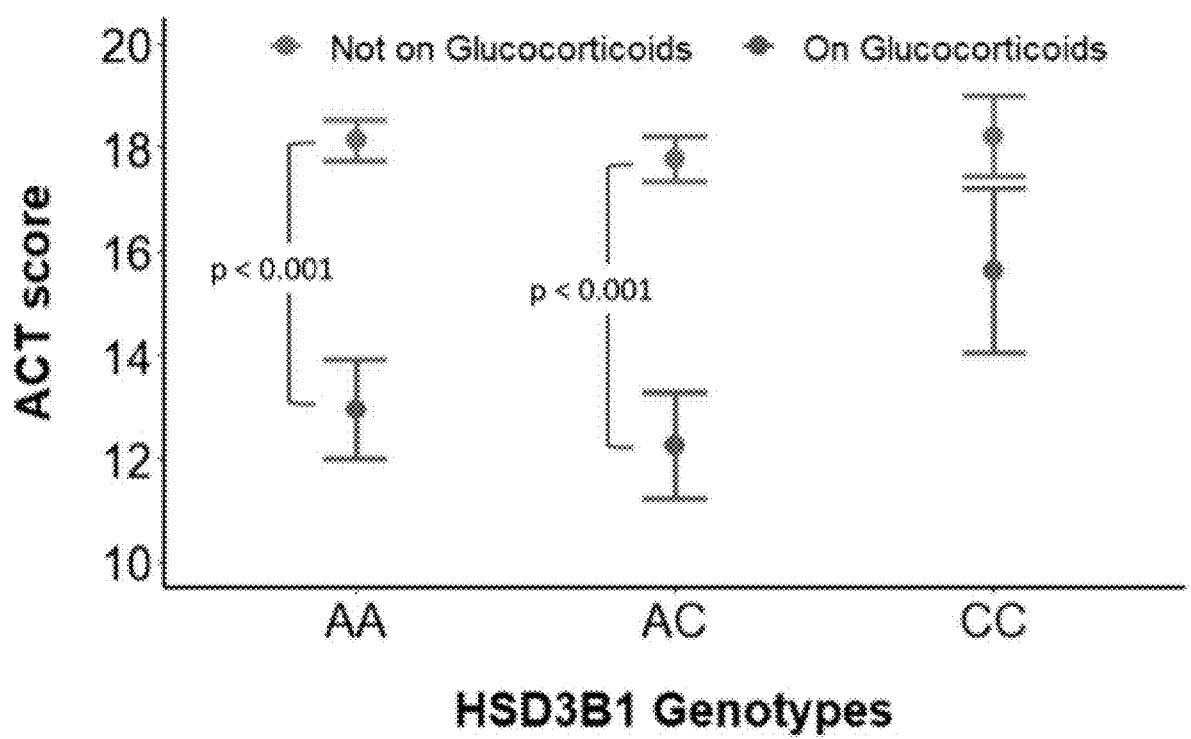
FIG. 12 shows comparative asthma control test (ACT) scores differ significantly for glucocorticoid (GC) treated patients who have 1-2 copies of the adrenal-restrictive HSD3B1 (1245A) allele. In contrast, patients who inherit 0 copies of the adrenal-restrictive HSD3B1 (1245A) allele have no significant difference between GC treated and untreated groups.
Figure 14:
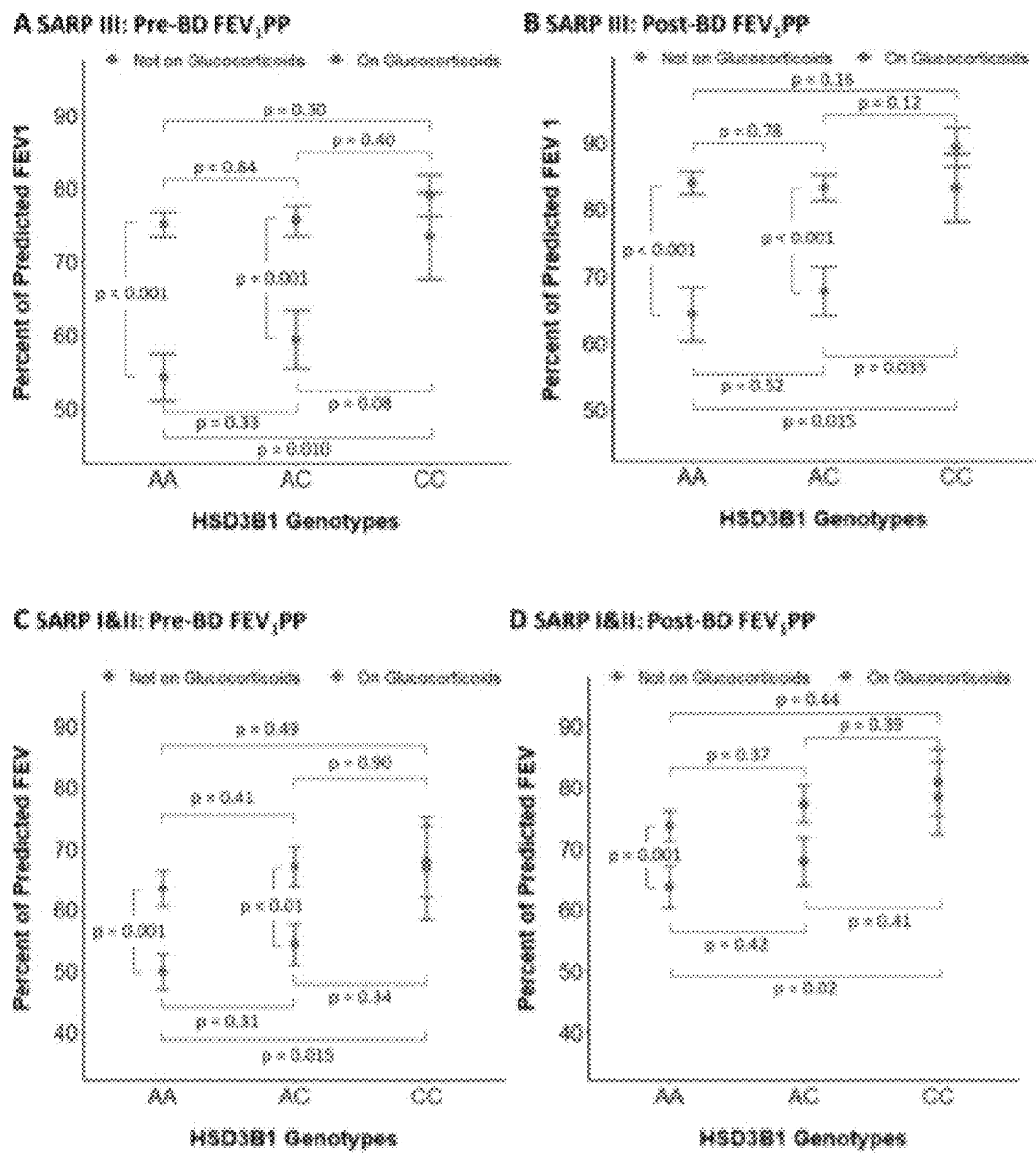
FIG. 14 shows additional statistical comparisons among groups are shown from FIG. 2.
Figure 15:
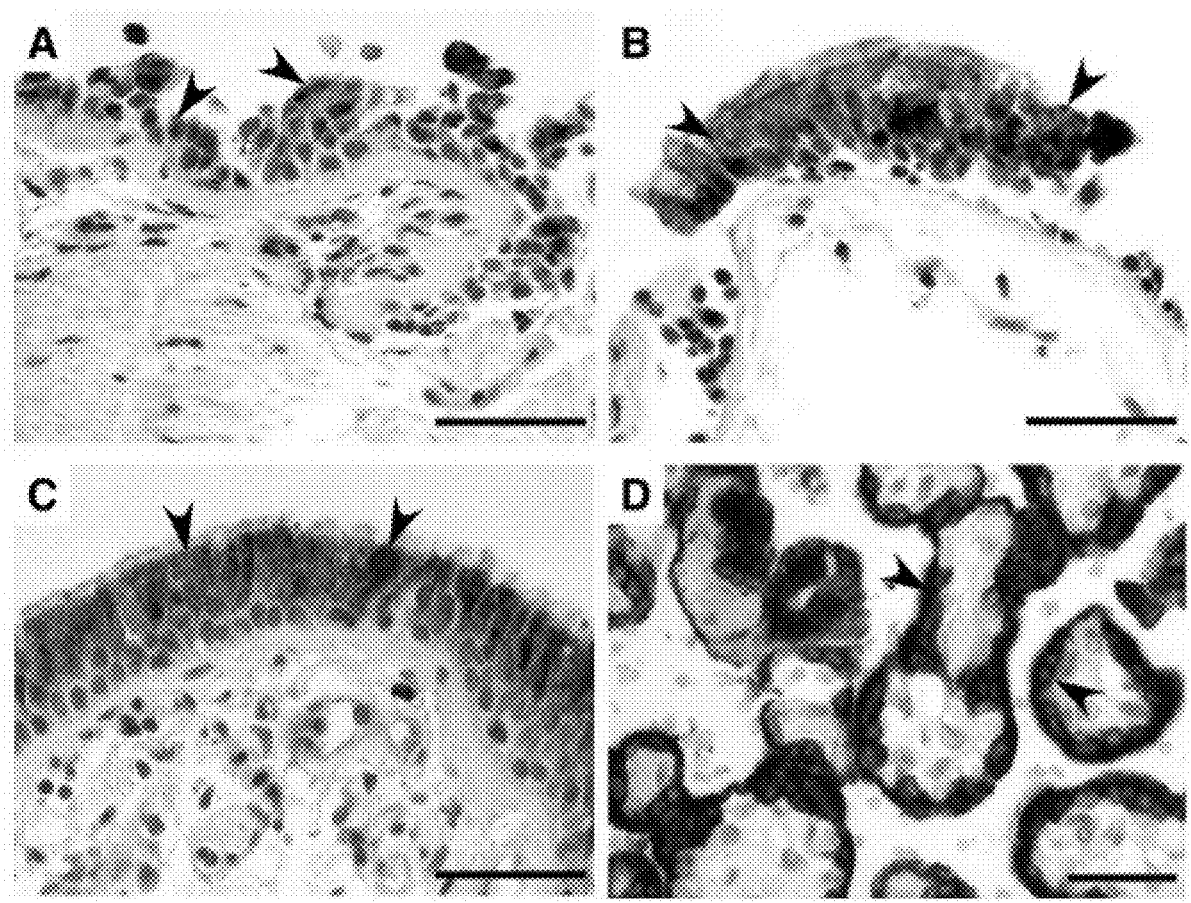
FIG. 15 shows immunohistochemistry of 3β-HSD1 in endobronchial biopsies of asthmatics. A-C, Images representative of multiple sections from 9 asthmatics. D, 3β-HSD1 expressed in trophoblasts of human placenta, which serves as a positive control. Arrowheads show positive staining. Scale bar: 40 μM. Paraffin-embedded formalin-fixed tissues were sectioned at 5 μm. Mouse anti-3β-HSD1 monoclonal antibody was used for analyses after antigen retrieval with 10 mM citrate buffer with 0.05% tween 20. Human placenta served as a positive control. Staining was performed using the Discovery ULTRA automated stainer from Ventana and slides were counterstained with hematoxylin.

In line with this observation, a lower FEV$_1$pp occurs in patients treated with high-dose inhaled GCs (HD-iCS) who have the adrenal restrictive HSD3B1 (1245A) allele compared with low-dose inhaled GCs (LD-iCS) [71.3 vs. 79.6; p=0.01]. In contrast, patients who are homozygous HSD3B1 (1245C) have no FEV$_1$pp difference in the high-dose vs. low-dose inhaled GC groups [77.1 vs. 80.3; p=0.58]. Furthermore, the magnitude of the effect of HSD3B1 genotype on FEV$_1$pp is lower for HD-iCS as opposed to oral GCs, in accordance with a lower magnitude of DHEA-S suppression (FIG. 5). Further data is shown in Table 5 below.

TABLE 5

Distribution of steroid therapies (oral and inhaled) among SARP 3 participants with available data on HSD3B1 genotype

| | Genotypes | | |
|---|---|---|---|
| | AA | AC | CC |
| All races (all SARP3 participants) | | | |
| LD-iCS | 96 | 68 | 22 |
| HD-iCS | 146 | 82 | 16 |
| Oral GC and HD-iCS | 29 | 23 | 6 |
| Caucasians | | | |
| LD-iCS | 58 | 51 | 21 |
| HD-iCS | 67 | 60 | 14 |
| Oral GC and HD-iCS | 21 | 20 | 6 |

Additional Tables

TABLE 6

Correlation between pre-bronchodilator FEV1PP and DHEA-S.

| | SARP III | | | SARP I & II | | |
|---|---|---|---|---|---|---|
| | All Adults | Men | Women | All Adults | Men | Women |
| All Races | | | | | | |
| n | 314 | 117 | 197 | 271 | 101 | 170 |
| $R^2$ | 0.041 | 0.158 | 0.040 | 0.126 | 0.143 | 0.246 |
| p | <0.001 | <0.001 | 0.005 | <0.001 | <0.001 | <0.001 |
| Caucasians | | | | | | |
| n | 203 | 85 | 118 | 178 | 65 | 112 |
| $R^2$ | 0.039 | 0.154 | 0.033 | 0.201 | 0.232 | 0.304 |
| p | 0.004 | <0.001 | 0.047 | <0.001 | <0.001 | <0.001 |

TABLE 7

Distribution of adult patients treated with daily oral GCs in SARP I&II or SARP III*

| | SARP III | | SARP I&II | |
|---|---|---|---|---|
| | All asthmatics | Severe Asthma | All asthmatics | Severe Asthma |
| All Subjects | 70 (13.3%) | 70 (22.6%) | 155 (13.7%) | 153 (33.7%) |
| African American | 10 (7.1%) | 10 (11.1%) | 32 (10.4%) | 32 (26.0%) |
| Caucasians | 56 (16.4%) | 56 (29%) | 114 (15.4%) | 112 (37.1%) |

*Figures are given as n (% of total).

TABLE 8

DHEA-S levels by daily oral GC use in both SARP I&II and SARP 3*.

| | SARP III | | | SARP I & II | | |
|---|---|---|---|---|---|---|
| | Not on daily GC | On daily GC | p | Not on daily GC | On daily GC | p |
| All Races | | | | | | |
| n | 267 | 47 | | 221 | 50 | |
| DHEA-S (ng/dL) | 97.6 ± 89.0 | 28.5 ± 22.0 | <0.001 | 150.8 ± 106.0 | 44.4 ± 46.2 | <0.001 |
| Caucasians | | | | | | |
| n | 163 | 40 | | 162 | 38 | |
| DHEA-S (ng/dL) | 92.9 ± 90.0 | 27.6 ± 19.9 | <0.001 | 141.5 ± 97.8 | 42.1 ± 48.6 | <0.001 |

*Figures are given as mean ± SD. p value from the Wilcoxon rank sum test.

Severe asthma is generally defined as asthma that remains symptomatic and exacerbation-prone despite controlled high dose inhaled ICS or systemic steroid treatment in conjunction with a second controller medication. Causes underlying severe asthma are heterogeneous, and many patients are refractory, even to recently-developed biological therapies. An aspect of severe asthma that is not commonly considered is that systemic GC therapy increases risk for low circulating levels of androgens, particularly DHEA-S.

This example provides a model in which HSD3B1 (1245) genotypes that confer less active conversion from adrenal precursors to potent androgens in peripheral tissues leads to a physiologic state of relative androgen deficiency that occurs specifically with DHEA-S suppression that is a consequence of systemic GC treatment. Strikingly, an HSD3B1 (1245) allele-dose dependent effect appears to be clear and occurs for pre-BD-FEV$_1$PP and post-BD-FEV$_1$PP in both SARP III and SARP I&II.

Generally, androgens require the AR to mediate much of their physiologic effects. Potent AR stimulation from adrenal DHEA/DHEA-S, that is available in circulation, requires enzymatic conversion by 3β-HSD1 to testosterone and dihydrotestosterone, which occurs in peripheral tissues. Given the variety of tissues in which AR is expressed, while the present invention is not limited to any particular mechanism, the association observed in this Example may be attributable to androgen stimulation in several different cell types. Androgens have many effects that could be beneficial for the asthmatic airway. For example, DHEA-S inhibits human airway smooth muscle and fibroblast proliferation and may benefit airway epithelial to mesenchymal transition. Both DHEA-S and testosterone promote airway smooth muscle relaxation. Testosterone is associated with decreased Th2 and Th1 inflammation in animal models of asthma.

Epidemiologically, androgens are associated with better lung function in large healthy cohorts and in disease. Increasing circulating levels of adrenal and gonadal androgens in males and females during adolescence are believed to be associated with improving asthma during adolescence, and gonadal androgens in particular may be associated with gender-based differences in asthma incidence and severity in adulthood. Notably, steroid metabolites downstream of DHEA-S are generated at the level of the target peripheral tissue and are generally not appreciable in circulation.

These data suggest that androgen depletion—whether circulating and/or at the tissue level—could contribute to the pathophysiology of severe asthma and resistance to oral GC therapy. The data in this Example shows that low DHEA-S levels in asthma are associated with low lung function.

We have identified a novel genetic determinant associated with GC resistance and low lung function in asthma. Evidence that the adrenal restrictive HSD3B1 (1245A) allele—which confers a lower level of prostate cancer adrenal androgen dependence by preventing local conversion of DHEA to more potent androgens—adversely affects lung function in GC-dependent severe asthma, suggests that androgens have a central role in the pathophysiology of human severe asthma and response to systemic GC treatment. This model is further supported by data showing a positive relationship between circulating adrenal DHEA-S levels and lung function. Indeed, androgens cause airway smooth muscle relaxation and prevent both remodeling and inflammation in animal models of asthma. GC use suppresses endogenous androgen production, preventing the beneficial effects of androgens in human asthma. These data indicate that HSD3B1 genotype is predictive of which patients might benefit from systemic GC therapy alone and for those who are resistant, who would benefit from androgen replacement in severe asthma.

Example 2

Figure 16:
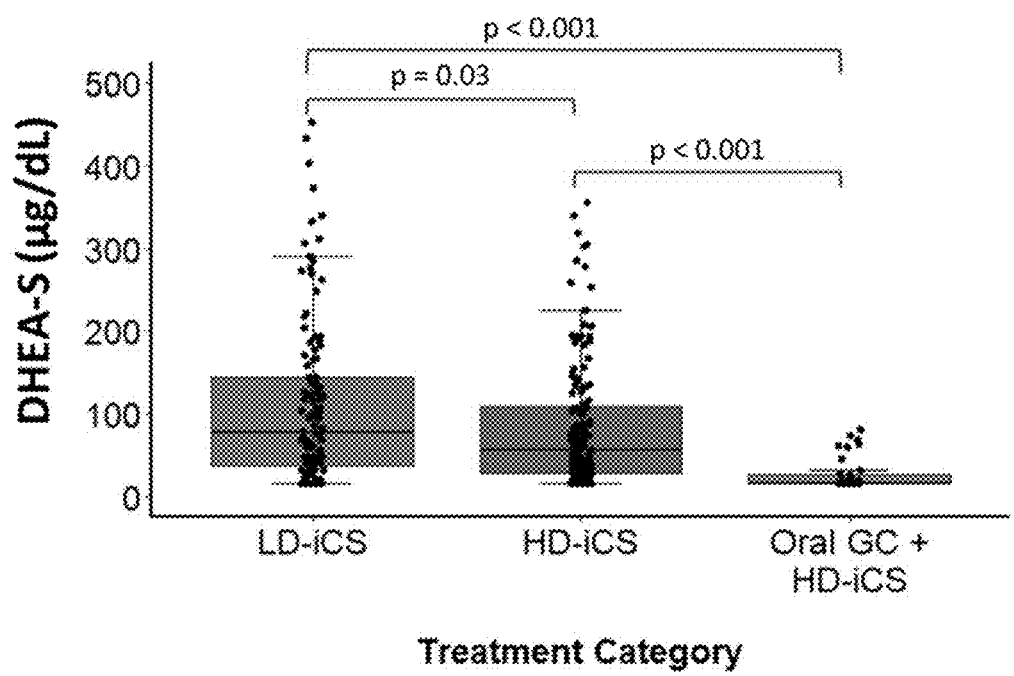
FIG. 16 shows results from Example 2, which shows that the magnitude of DHEA-S suppression with high-dose inhaled GCs is less than occurs with oral GCs (26% vs. 76% decline; $p<0.001$).
Figure 17:
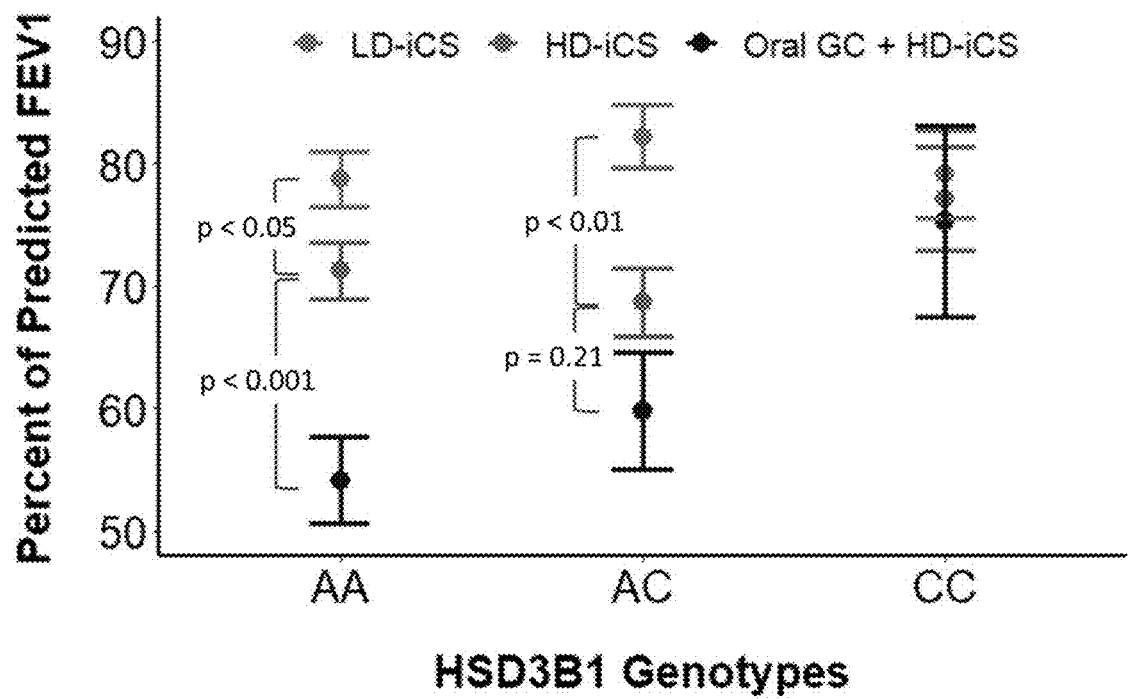
FIG. 17 shows results from Example 2, which shows the magnitude of the effect of HSD3B1 genotype on FEV1pp is lower for HD-iCS as opposed to oral GCs, in accordance with a lower magnitude of DHEA-S suppression.

High dose and low dose glucocorticoid treatment of patients was tested. The magnitude of DHEA-S suppression with high-dose inhaled GCs is less than occurs with oral GCs (26% vs. 76% decline; p<0.001), as seen in Table 9 and FIG. 16. In line with this observation, a lower FEV1pp occurs in patients treated with high-dose inhaled GCs (HD-iCS) who have the adrenal restrictive HSD3B1 (1245A) allele compared with low-dose inhaled GCs (LD-iCS) [71.3 vs. 79.6; p=0.01]. In contrast, patients who are homozygous HSD3B1 (1245C) have no FEV1pp difference in the high-dose vs. low-dose inhaled GC groups [77.1 vs. 80.3; p=0.58]. Furthermore, the magnitude of the effect of HSD3B1 genotype on FEV1pp is lower for HD-iCS as opposed to oral GCs, in accordance with a lower magnitude of DHEA-S suppression (FIG. 17).

TABLE 9

DHEA-S levels (ng/dL) by treatment category

| Rx_cat | Mean | SD | Median | IQR |
|---|---|---|---|---|
| LD-iCS | 110.5 | 100.9 | 76.5 | 107.2 |
| HD-iCS | 82.5 | 76.1 | 56.9 | 81.6 |
| Oral GC + HD-iCS | 26.3 | 20.1 | 14.9 | 11.5 |

TABLE 10

Distribution of steroid therapies (oral and inhaled) among SARP 3 participants with available data on HSD3B1 genotype

| | Genotypes | | |
|---|---|---|---|
| | AA | AC | CC |
| All races (all SARP3 participants) | | | |
| LD-iCS | 96 | 68 | 22 |
| HD-iCS | 146 | 82 | 16 |
| Oral GC and HD-iCS | 29 | 23 | 6 |
| Caucasians | | | |
| LD-iCS | 58 | 51 | 21 |
| HD-iCS | 67 | 60 | 14 |
| Oral GC and HD-iCS | 21 | 20 | 6 |

REFERENCES

1. Hench et al., J Am Med Assoc 1950; 144:1327-35.
2. Barnes et al., Lancet 2009; 373:1905-17.
3. Chung et al., The European respiratory journal 2014; 43:343-73.
4. Koziol-White et al., Biochimica et biophysica acta 2012; 1822:1638-42.
5. Mendoza-Milla et al., The European respiratory journal 2013; 42:1309-21.
6. Xu et al., Exp Lung Res 2014; 40:211-21.
7. Kouloumenta et al., Br J Pharmacol 2006; 149:1083-91.
8. Cephus et al., Cell Rep 2017; 21:2487-99.
9. Fuseini et al., Journal of immunology 2018; 201:1843-54.
10. Svartberg et al., Eur J Epidemiol 2007; 22:107-12.
11. Mohan et al., Clin Endocrinol (Oxf) 2015; 83:268-76.
12. DeBoer et al., BMC Pulm Med 2018; 18:58.
13. Auchus et al., Endocr Dev 2011; 20:20-7.
14. Sharifi, Molecular endocrinology 2013; 27:708-14.
15. Hazeldine et al., The Journal of steroid biochemistry and molecular biology 2010; 120:127-36.
16. Chang et al., Cell 2013; 154:1074-84.
17. Hearn et al., Lancet Oncol 2016; 17:1435-44.
18. Agarwal et al., JAMA Oncol 2017; 3:856-7.
19. Hearn et al., JAMA Oncol 2018; 4:558-62.
20. Shiota et al., JAMA Netw Open 2019; 2: e190115.
21. Garcia et al., European Society of Oncology Pharmacy. Nantes, France; 2018.
22. Hearn et al., ASCO; 2019; Chicago, IL; 2019.
23. Brusasco et al., The European respiratory journal 2005; 26:1-2.
24. Miller et al., The European respiratory journal 2005; 26:319-38.
25. Quanjer et al., The European respiratory journal 2012; 40:1324-43.
26. Teague et al., The journal of allergy and clinical immunology In practice 2018; 6:545-54 e4.
27. Phipatanakul et al., American journal of respiratory and critical care medicine 2017; 195:1439-48.
28. Moore et al., The Journal of allergy and clinical immunology 2007; 119:405-13.
29. Jarjour et al., American journal of respiratory and critical care medicine 2012; 185:356-62.
30. Moore et al., American journal of respiratory and critical care medicine 2010; 181:315-23.
31. Proceedings of the ATS workshop on refractory asthma: current understanding, recommendations, and unanswered questions. American Thoracic Society. American journal of respiratory and critical care medicine 2000; 162:2341-51.
32. Purcell et al., American journal of human genetics 2007; 81:559-75.
33. Chang et al., Gigascience 2015; 4:7.
34. The ENFUMOSA cross-sectional European multicentre study of the clinical phenotype of chronic severe asthma. European Network for Understanding Mechanisms of Severe Asthma. The European respiratory journal 2003; 22:470-7.
35. Denlinger et al., American journal of respiratory and critical care medicine 2016.
36. Dorsey et al., Annals of allergy, asthma & immunology: official publication of the American College of Allergy, Asthma, & Immunology 2006; 97:182-6.
37. Tantisira et al., American journal of respiratory and critical care medicine 2008; 178:325-31.
38. Becklake et al., Thorax 1999; 54:1119-38.

39. Tse et al., The Journal of allergy and clinical immunology 2016; 138:1561-8 e6.
40. Labrie et al., Ann Endocrinol (Paris) 2003; 64:95-107.
41. U.S. Pat. No. 9,856,536

All publications and patents mentioned in the present application are herein incorporated by reference. Various modification and variation of the described methods and compositions of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. A method comprising:
   a) obtaining a sample from a Caucasian human subject with severe asthma,
   b) testing said sample from said subject to determine:
      i) said subject is C/C at position 1245 in the HSD3B1 gene, and/or
      ii) said subject expresses only the 367T version of the 3β-HSD1 protein, and
   c) treating said subject orally and/or by inhalation with a glucocorticoid.

2. The method of claim 1, wherein said sample comprises a sample type selected from: urine, saliva, serum, plasma, tissue biopsy, and whole blood.

3. A method comprising:
   a) receiving and/or reviewing a report that a Caucasian subject with severe asthma that has not been diagnosed with any other chronic pulmonary disorder is C/C at position 1245 in the HSD3B1 gene and/or expresses only a 367T version of said 3β-HSD1 protein; and
   b) treating said subject orally and/or by inhalation with a glucocorticoid.

4. The method of claim 3, wherein said report indicates that said subject is C/C at position 1245 in the HSD3B1 gene.

5. The method of claim 3, wherein said report indicates that said subject only expresses a 367T version of said 3β-HSD1 protein.

6. The method of claim 3, wherein said glucocorticoid is an inhaled glucocorticoid.

7. The method of claim 6, wherein said inhaled glucocorticoid comprises fluticasone at over 440 micrograms per day.

8. The method of claim 3, wherein said glucocorticoid is selected from the group consisting of: hydrocortisone, prednisone, prednisolone, and dexamethasone.

* * * * *